(12) United States Patent
Shelnutt et al.

(10) Patent No.: US 9,266,053 B2
(45) Date of Patent: Feb. 23, 2016

(54) SYSTEM AND METHOD FOR CONCENTRATING GAS

(71) Applicants: Samuel J. Shelnutt, North Ridgeville, OH (US); William J. Daniels, Wadsworth, OH (US)

(72) Inventors: Samuel J. Shelnutt, North Ridgeville, OH (US); William J. Daniels, Wadsworth, OH (US)

(73) Assignee: Invacare Corporation, Elyria, OH (US)

(*) Notice: Subject to any disclaimer, the term of this patent is extended or adjusted under 35 U.S.C. 154(b) by 10 days.

(21) Appl. No.: 13/790,312

(22) Filed: Mar. 8, 2013

(65) Prior Publication Data

US 2013/0333564 A1  Dec. 19, 2013

Related U.S. Application Data

(60) Provisional application No. 61/661,260, filed on Jun. 18, 2012.

(51) Int. Cl.
*B01D 53/02* (2006.01)
*B01D 53/047* (2006.01)
*F04B 43/04* (2006.01)
(Continued)

(52) U.S. Cl.
CPC .......... *B01D 53/047* (2013.01); *B01D 53/0407* (2013.01); *B01D 53/0446* (2013.01); *B01D 53/0476* (2013.01); *F04B 19/006* (2013.01); *F04B 43/043* (2013.01); *F04B 43/046* (2013.01); *F04B 45/043* (2013.01); *F04B 45/047* (2013.01); *B01D 2253/108* (2013.01); *B01D 2256/12* (2013.01); *B01D 2257/102* (2013.01); *B01D 2259/4533* (2013.01)

(58) Field of Classification Search
CPC ..................... B01D 2253/108; B01D 2256/12; B01D 2257/102; B01D 2259/4533; B01D 2259/4541; B01D 53/0446; B01D 53/0454; B01D 53/047; B01D 53/0476; B01D 53/30; F04B 43/043; F04B 43/046; F04B 45/043; F04B 45/047
See application file for complete search history.

(56) References Cited

U.S. PATENT DOCUMENTS 4,127,395 A   11/1978   McKey et al.
4,144,037 A   3/1979   Armond et al.
(Continued)

FOREIGN PATENT DOCUMENTS

DE   29605889        6/1996
DE   102007021564   11/2008
(Continued)

OTHER PUBLICATIONS

Office Action from U.S. Appl. No. 13/790,826 dated Sep. 9, 2014.
(Continued)

*Primary Examiner* — Christopher P Jones
(74) *Attorney, Agent, or Firm* — Calfee, Halter & Griswold LLP

(57) ABSTRACT

Systems and methods for producing a product gas are provided. In one embodiment, a plurality of gas separation assemblies separate adsorbable components from a gas source using a plurality of micro-pumps to create gas flow through the gas separation assemblies. Various embodiments include implementation of various pressure swing adsorbtion (PSA), vacuum swing adsorbtion (VSA), and vacuum pressure swing adsorbtion (VPSA) systems utilizing the gas separation assemblies with micro-pumps. In other embodiments, micro-pumps and micro-pump assemblies are arranged in various configurations capable of providing a range of pressures and flow rates.

22 Claims, 23 Drawing Sheets

(51) Int. Cl.
  *B01D 53/04* (2006.01)
  *F04B 45/04* (2006.01)
  *F04B 45/047* (2006.01)
  *F04B 19/00* (2006.01)

(56) References Cited

U.S. PATENT DOCUMENTS

| | | |
|---|---|---|
| 4,247,311 A | 1/1981 | Seibert |
| 4,449,990 A | 5/1984 | Tedford |
| 4,561,287 A | 12/1985 | Rowland |
| 4,648,888 A | 3/1987 | Rowland |
| 4,826,510 A | 5/1989 | McCombs |
| 4,832,711 A | 5/1989 | Christel, Jr. et al. |
| 4,932,402 A | 6/1990 | Snook et al. |
| 4,971,609 A | 11/1990 | Pawlos |
| 5,099,837 A | 3/1992 | Russel et al. |
| 5,258,056 A | 11/1993 | Shirley et al. |
| 5,474,595 A | 12/1995 | McCombs |
| 5,593,478 A | 1/1997 | Hill et al. |
| 5,626,131 A | 5/1997 | Chua et al. |
| 5,720,276 A | 2/1998 | Kobatake et al. |
| 5,785,681 A | 7/1998 | Indravudh |
| 5,906,672 A | 5/1999 | Michaels et al. |
| 5,917,135 A | 6/1999 | Michaels et al. |
| 5,988,165 A | 11/1999 | Richey, II et al. |
| 6,051,051 A | 4/2000 | Hees et al. |
| 6,106,245 A | 8/2000 | Cabuz |
| 6,427,690 B1 | 8/2002 | McCombs et al. |
| 6,517,610 B1 | 2/2003 | De La Houssaye |
| 6,520,176 B1 | 2/2003 | Dubois et al. |
| 6,561,187 B2 | 5/2003 | Schmidt et al. |
| 6,629,525 B2 | 10/2003 | Hill et al. |
| 6,651,658 B1 | 11/2003 | Hill et al. |
| 6,691,702 B2 | 2/2004 | Appel et al. |
| 6,764,534 B2 | 7/2004 | McCombs et al. |
| 6,837,244 B2 | 1/2005 | Yagi et al. |
| 6,878,186 B2 | 4/2005 | Neary |
| 6,949,133 B2 | 9/2005 | McCombs et al. |
| 6,962,654 B2 | 11/2005 | Arnaud |
| 7,294,170 B2 | 11/2007 | Richey, II et al. |
| 7,306,657 B2 | 12/2007 | Yagi et al. |
| 7,329,304 B2 | 2/2008 | Bliss et al. |
| 7,393,382 B2 | 7/2008 | Givens |
| 7,445,663 B1 | 11/2008 | Hunter et al. |
| 7,455,717 B2 | 11/2008 | Sprinkle |
| 7,604,005 B2 | 10/2009 | Jagger et al. |
| 7,686,870 B1 | 3/2010 | Deane et al. |
| 7,722,700 B2 | 5/2010 | Sprinkle |
| 7,766,010 B2 | 8/2010 | Jagger et al. |
| 7,875,105 B2 | 1/2011 | Chambers et al. |
| 8,062,003 B2 | 11/2011 | Goertzen et al. |
| 8,070,853 B2 | 12/2011 | Sprinkle |
| 8,262,771 B2 | 9/2012 | Seki et al. |
| 2002/0053286 A1 | 5/2002 | Czabala |
| 2003/0180164 A1 | 9/2003 | Bunner et al. |
| 2003/0215342 A1 | 11/2003 | Higashino |
| 2003/0231967 A1 | 12/2003 | Najafi et al. |
| 2004/0079359 A1 | 4/2004 | Aylsworth et al. |
| 2006/0086251 A1 | 4/2006 | Sprinkle |
| 2006/0174872 A1 | 8/2006 | Jagger |
| 2008/0066616 A1 | 3/2008 | Sprinkle |
| 2008/0257145 A1 | 10/2008 | Sprinkle |
| 2009/0065526 A1 | 3/2009 | Sprinkle |
| 2009/0211448 A1 | 8/2009 | McClain |
| 2010/0071698 A1 | 3/2010 | Kiritake |
| 2010/0095841 A1 | 4/2010 | Naheiri |
| 2010/0114218 A1 | 5/2010 | Heath |
| 2010/0242734 A1 | 9/2010 | Maeda et al. |
| 2011/0017216 A1 | 1/2011 | Van Brunt et al. |
| 2011/0315140 A1 | 12/2011 | Shuman |
| 2013/0233168 A1 | 9/2013 | Richey, II |

FOREIGN PATENT DOCUMENTS

| | | |
|---|---|---|
| EP | 420620 | 4/1991 |
| EP | 1661596 | 5/2006 |
| GB | 1270296 | 4/1972 |
| WO | 98/56488 | 12/1998 |
| WO | 98/57165 | 12/1998 |
| WO | 2008/036159 | 3/2008 |
| WO | 2008/131338 | 10/2008 |
| WO | 2013/134645 | 9/2013 |

OTHER PUBLICATIONS

Response to Office Action from U.S. Appl. No. 13/790,826 dated Dec. 9, 2014.
Office Action from U.S. Appl. No. 13/839,954 dated Oct. 9, 2014.
Office Action from U.S. Appl. No. 13/790,473 dated Sep. 9, 2014.
Response to Office Action from U.S. Appl. No. 13/790,473 dated Dec. 9, 2014.
Partial International Search Report from PCT/US13/46086 dated Sep. 23, 2013.
International Search Report from PCT/US13/46086 dated Dec. 12, 2013.
International Search Report and Written Opinion from PCT/US14/10409 dated Jun. 12, 2014.
International Preliminary Report on Patentability from PCT/US14/04086 dated Dec. 23, 2014.
Response to Office Action from Canadian Application No. 2,793,228 dated Jan. 29, 2014.
Office action from European Application No. 12184137.7 dated Oct. 1, 2013.
Response from European Application No. 12184137.7 dated Apr. 11, 2014.
Communication to Rules 161(1) and 162 EPC from European Application No. 137017464.5 dated Nov. 7, 2014.
Response from New Zealand Application No. 603120 dated Dec. 23, 2013.
First Examination Report from New Zealand Application No. 619,142 dated Jan. 29, 2014.
Response from Chinese Application No. 200780034658.2 dated Nov. 4, 2013.
Notice of Allowance from U.S. Appl. No. 13/790,826 dated Jan. 22, 2015.
Notice of Allowance from U.S. Appl. No. 13/790,473 dated Jan. 12, 2015.
International Search Report and Written Opinion from PCT/US07/18468 dated Feb. 11, 2008.
International Search Report and Written Opinion from PCT/US08/61022 dated Jul. 18, 2008.
International Search Report and Written Opinion from PCT/US13/029885 dated May 31, 2013.
Invacare Corporation, Oxygen Products Brochure, Form No. 05-054, 20 pages, copyright 2005.
Invacare Corporation, Oxygen Products Brochure, Form. No. 05-054, 16 pgs., copyright 2008.
Invacare Corp., XP02 Portable Concentrator, Invacare Product Catalog, www.invacare.com/cgi-bin/imhqprd/inv_catalog/prod_cat_detail.jsp?s=0 & prodID=XPO100 & catOID=-536885301, printed Mar. 17, 2008, 1 pg.
Office action from U.S. Appl. No. 11/258,480 dated Feb. 12, 2008.
Response to Office action from U.S. Appl. No. 11/258,480 dated May 9, 2008.
Notice of Allowance from U.S. Appl. No. 11/258,480 dated Jul. 21, 2008.
Office action from U.S. Appl. No. 11/522,683 dated Jun. 8, 2009.
Response to Office action from U.S. Appl. No. 11/522,683 dated Dec. 8, 2009.
Notice of Allowance from U.S. Appl. No. 11/522,683 dated Dec. 30, 2009.
Office action from U.S. Appl. No. 12/106,861 dated Jul. 21, 2010.
Response from U.S. Appl. No. 12/106,861 dated Oct. 21, 2010.
Office action from U.S. Appl. No. 12/106,861 dated Dec. 7, 2010.
Response from U.S. Appl. No. 12/106,861 dated Apr. 6, 2011.
Office Action from U.S. Appl. No. 12/106,861 dated Jun. 14, 2012.

(56) References Cited

OTHER PUBLICATIONS

Amendment from U.S. Appl. No. 12/106,861 dated Oct. 15, 2012.
Final Office Action from U.S. Appl. No. 12/106,861 dated Oct. 23, 2012.
Amendment with RCE from U.S. Appl. No. 12/106,861 dated Jan. 23, 2013.
Notice of Allowance for U.S. Appl. No. 12/106,861 dated Jun. 12, 2013.
Office action from U.S. Appl. No. 12/274,026 dated Nov. 8, 2010.
Amendment with Terminal Disclaimer from U.S. Appl. No. 12/274,026 dated Mar. 8, 2011.
Notice of Allowance from U.S. Appl. No. 12/274,026 dated May 11, 2011.
Notice of Allowance from U.S. Appl. No. 12/274,026 dated Sep. 28, 2011.
Examination Report from AU Application No. 2007297814 dated Feb. 4, 2010.
Response from Australian Application No. 2007297814 dated Apr. 4, 2011.
Office action from Australian Application No. 2008242596 dated Jul. 14, 2010.
Response from Australian Application No. 2008242596 dated Sep. 26, 2011.
Further Examination Report from Australian Application No. 2008242596 dated Oct. 7, 2011.
Response to Examiner's Second Report from Australian Application No. 2008242596 dated Feb. 8, 2012.
First Office Action in AU Patent Application No. 2012203342 dated Dec. 21, 2012.
Response to Office Action from Canadian Application No. 2,663,902 dated Apr. 20, 2010.
Office action from Canadian Application No. 2,663,902 dated Oct. 20, 2010.
Response to Office Action from Canadian Application No. 2,663,902 dated Apr. 20, 2011.
Office action from Canadian Application No. 2,684,871 dated May 31, 2011.
Response to Office Action from Canadian Application No. 2,684,871 dated Nov. 30, 2011.
First Office Action in Canadian Application No. 2,793,228 dated Jan. 8, 2013.
Response from Canadian Application No. 2,793,228 dated Jun. 17, 2013.
Second Office Action from Canadian Application No. 2,793,228 dated Jul. 29, 2013.
Communication from EP Application No. 07837126.7 dated Sep. 3, 2010.
Response from EP Application No. 07837126.7 dated Mar. 14, 2011.
Exam Report from EP Application No. 07837126.7 dated Sep. 27, 2011.
Response from EP Application No. 07837126.7 dated Mar. 16, 2012.
Notice of Grant of EP Application No. 07837126.7 dated Jul. 8, 2013.
Search Report from EP Application No. 08746446.7 dated Aug. 2, 2011.
Response from EP Application No. 08746446.7 dated Feb. 3, 2012.
Office Action from EP Application No. 08746446.7 dated Jun. 27, 2012.
Response to Communication from EP Application No. 08746446.7 dated Dec. 27, 2012.
Response to OA requesting claims in EP Application No. 12184137.3 dated Dec. 4, 2012.
Extended EP Search Report for EP Application No. 12184137.3 dated Feb. 14, 2013.
Response from European Application No. 12184137.3 dated Aug. 27, 2013.
Examination Report from New Zealand Application No. 575,059 dated Dec. 15, 2010.
Response to New Zealand Application No. 575,059 dated May 8, 2012.
Office Action from New Zealand Application No. 575,059 dated May 22, 2012.
Response to Office Action from New Zealand Application No. 575,059 dated Jun. 28, 2012.
First Examination Report from New Zealand Application No. 580,515 dated Mar. 23, 2011.
Examination Report from New Zealand Application No. 580,515 dated Aug. 14, 2012.
Response to First Examination Report from New Zealand Application No. 580,515 dated Jul. 23, 2012.
Response to Second Examination Report from New Zealand Application No. 580,515 dated Oct. 18, 2012.
Third Examination Report from New Zealand Application No. 580,515 dated Nov. 9, 2012.
Response to Third Examination Report from New Zealand Application No. 580,515 dated Nov. 15, 2012.
Office action from New Zealand Application No. 603120 dated Oct. 26, 2012.
Office Action from Chinese Application No. 200780034658.2 dated Nov. 14, 2011.
Response to Office Action from Chinese Application No. 200780034658.2 dated May 4, 2012.
Office action from Chinese Application No. 200780034658.2 dated Aug. 1, 2012.
Response to Second Office action from Chinese Application No. 200780034658.2 dated Dec. 17, 2012.
Third Office Action from Chinese Application No. 200780034658.2 dated Jan. 21, 2013 (received Mar. 5, 2013).
Response to Third Office Action fron Chinese Application No. 200780034658.2 dated Jun. 5, 2013.
Office action from Chinese Application No. 200780034658.2 dated Jun. 19, 2013.
Office Action from Chinese Application No. 200880021148.6 dated Nov. 1, 2011.
Response to Office Action from Chinese Application No. 200880021148.6 dated May 13, 2012.
Second Office Action from Chinese Application No. 200880021148.6 dated Oct. 25, 2012 (received Dec. 3, 2012).
Response from Chinese Application No. 200880021148.6 dated Mar. 8, 2013.
Third Office Action from Chinese Application No. 200880021148.6 dated May 2, 2013 (received Jun. 13, 2013).
Response from Chinese Application No. 200880021148.6 dated Jul. 17, 2013.
First Office Action in Colombian Application No. 09028163 dated Aug. 22, 2012.
Response from Colombian Application No. 09028163 dated Nov. 6, 2012.
Response to Office Action from U.S. Appl. No. 13/839,954 dated Jan. 9, 2015.
Notice of Allowance from U.S. Appl. No. 13/839,954 dated Feb. 20, 2015.
Notice of Allowance from U.S. Appl. No. 13/790,473 dated Apr. 21, 2015.
Summons to Attend Oral Hearing from European Application No. 12184137.3 dated Apr. 8, 2015.

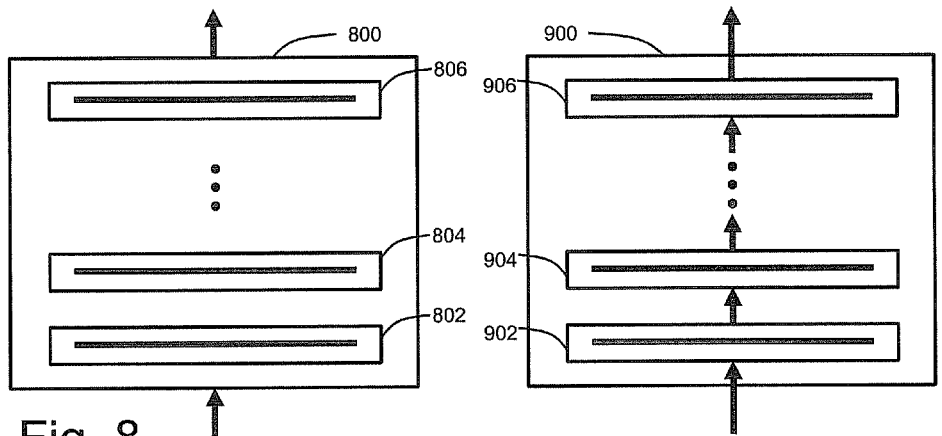
Fig. 8
Fig. 9
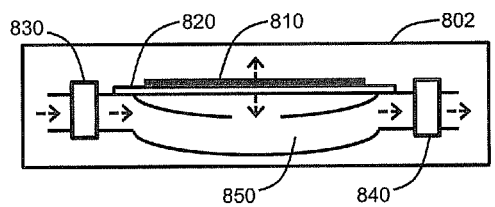
Fig. 8A
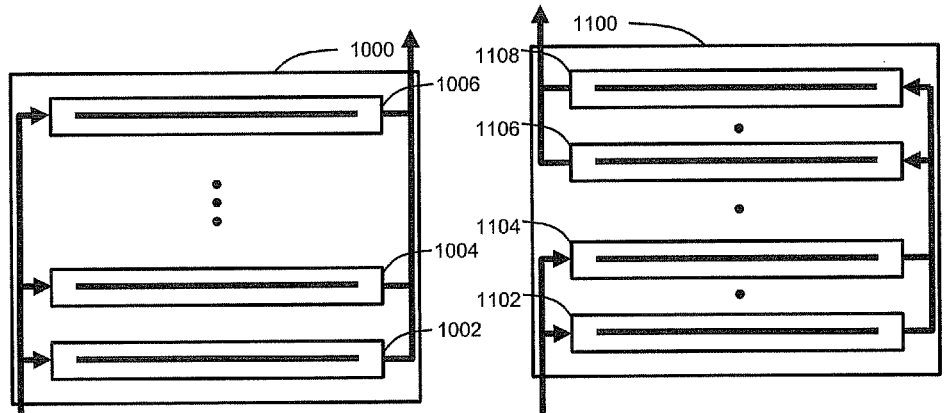
Fig. 10
Fig. 11

SYSTEM AND METHOD FOR CONCENTRATING GAS

CROSS REFERENCE TO RELATED APPLICATIONS

This application claims priority to, and the benefits of, U.S. provisional application Ser. No. 61/661,260 filed on Jun. 18, 2012, which is incorporated by reference herein in full.

BACKGROUND

Various applications exist for the separation of gaseous mixtures. For example, the separation of nitrogen from atmospheric air can provide a highly concentrated source of oxygen. These various applications include the provision of elevated concentrations of oxygen for medical patients and flight personnel. Hence, it is desirable to provide systems that separate gaseous mixtures to provide a concentrated product gas, such as a breathing gas with a concentration of oxygen.

Several existing product gas or oxygen concentrating systems and methods, for example, are disclosed in U.S. Pat. Nos. 4,449,990, 5,906,672, 5,917,135, 5,988,165, 7,294,170, 7,455,717, 7,722,700, 7,875,105, 8,062,003, 8,070,853 and U.S. patent application Ser. Nos. 12/106,861, 61/750,517, and 61/608,874, which are commonly assigned to Invacare Corporation of Elyria, Ohio and fully incorporated herein by reference.

SUMMARY

In one embodiment, a system for producing a product gas, including at least one gas separation assembly to separate adsorbable components from a gas source, wherein each of the at least one gas separation assemblies includes at least one micro-pump assembly, each micro-pump assembly including at least one micro-pump, a separation bed to separate product gas from a source gas, separation assembly valving to direct source gas to the separation bed and to direct product gas from the separation bed during a fill cycle, a controller, including logic to control the separation assembly valving of each of the at least one gas separation assemblies to produce the product gas.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

FIG. 8 illustrates one embodiment of a pressure or vacuum source assembly;

FIG. 8A illustrates in schematic form one embodiment of a micro-pump;

FIG. 9 illustrates one embodiment of a pressure or vacuum source assembly with a plurality of micro-pumps in series configuration;

FIG. 10 illustrates one embodiment of a pressure or vacuum source assembly with a plurality of micro-pumps in parallel configuration;

FIG. 11 illustrates one embodiment of a pressure or vacuum source assembly having parallel banks of micro-pumps, where each bank includes a plurality of micro-pumps in parallel configuration with each other;

DESCRIPTION

As described herein, when one or more components are described or shown as being connected, joined, affixed, coupled, attached, or otherwise interconnected, such interconnection may be direct as between the components or may be in direct such as through the use of one or more intermediary components. Also as described herein, reference to a member, component, or portion shall not be limited to a single structural member, component, element, or portion but can include an assembly of components, members, elements, or portions. Furthermore, any one or more components may be integrated into common housings, assemblies or other components.

Figure 1A:
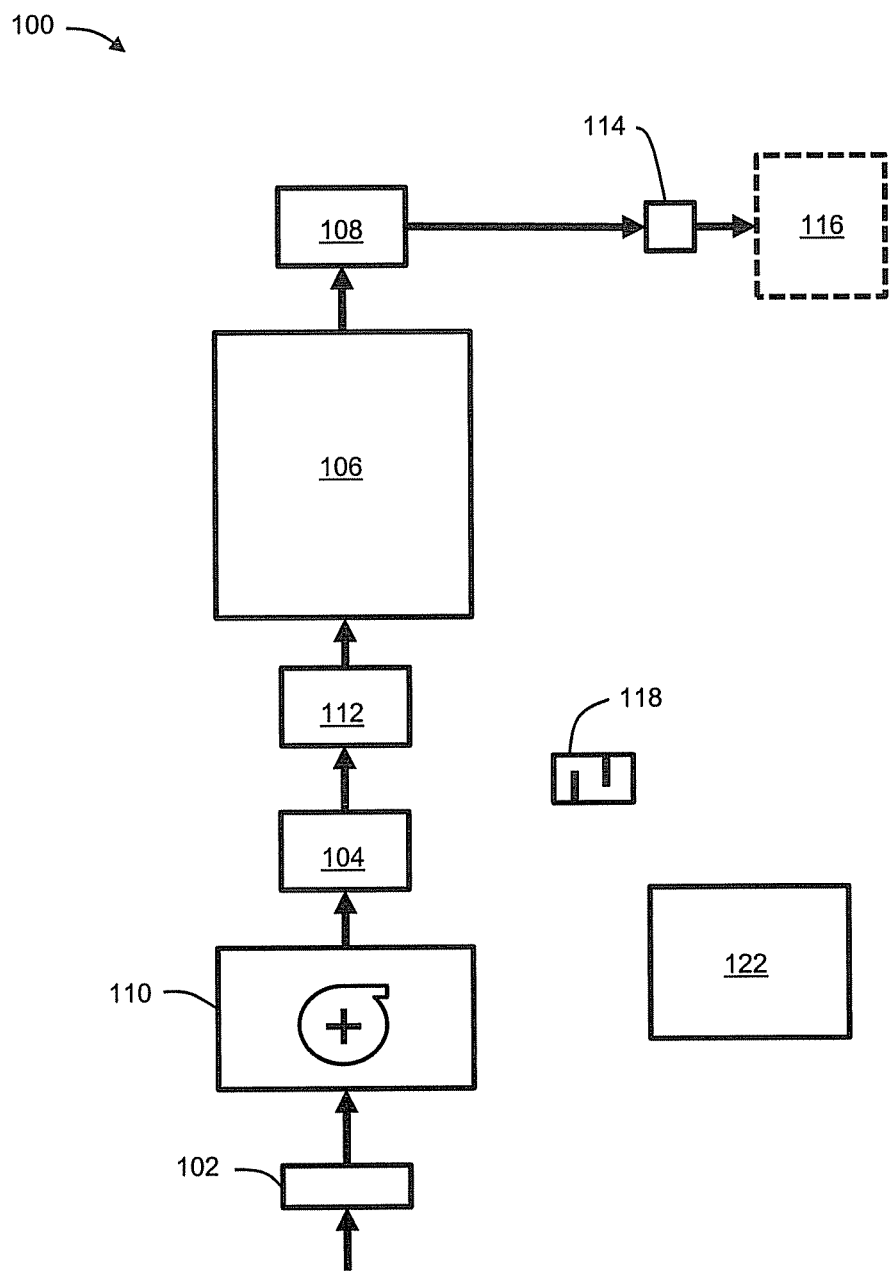
FIGS. 1A through 7 illustrate exemplary fill and purge cycles of various embodiments of a system for generating concentrated product gas.
Figure 1B:
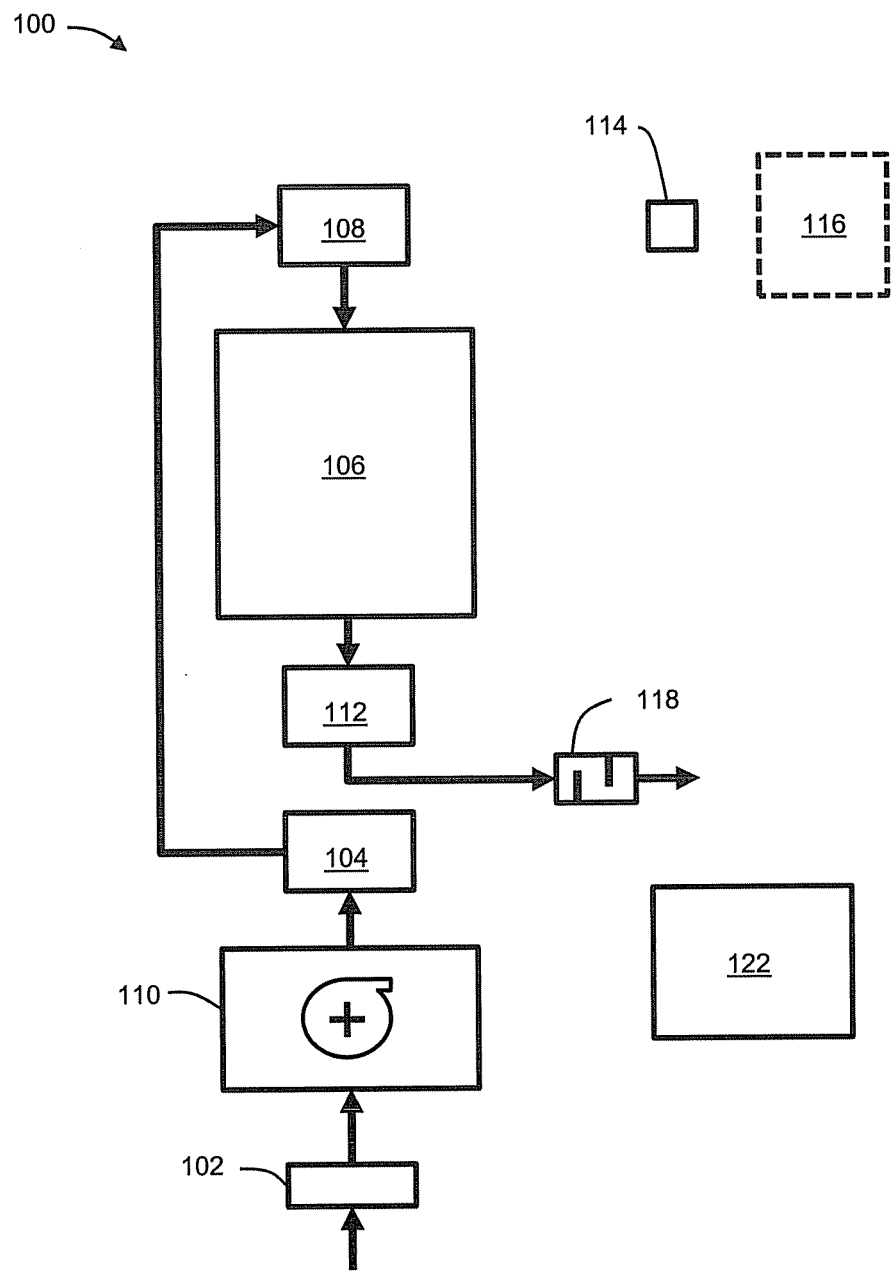

Illustrated in FIGS. 1A and 1B is one embodiment of an exemplary gas concentrating system 100 using pressure swing adsorption (PSA). System 100 includes a filter 102, flow control valves 104, 108, 112, 114, separation bed 106, pressure source or assembly 110, muffler 118 and a processor-based control system 122. These components work to provide a concentrated gas such as, for example, oxygen, to an optional product tank 116 or other product distribution components.

Although certain exemplary valves and other components are shown and described in the included embodiments, many other combinations of valves, flow paths, pressure/vacuum sources, storage vessels, etc. may be used in a similar manner to provide a gas concentration system. For example, two valves may be shown as separate valves in the included embodiments, but may be implemented as a two-way valve with similar functionality.

Control system 122 may be microprocessor-based and can include logic therein controlling the operation of the gas separation components and processes described herein. Control system 122 includes, for example, one or more processors and storage devices such as memories for storing the control logic and other necessary parameters for operation. Control system 122 may control the operation of the system 100 based on communication with other devices, such as, for example, inputs, sensors, etc. Inputs may include, for example, user, operator, and programmer inputs, among others. Sensors may include pressure, flow, temperature, and gas concentration, among others. The other devices may be separate devices or devices integrated with the components of system 100 mentioned above.

System 100 generally intakes room air, which is mostly comprised of nitrogen and oxygen, and separates the nitrogen from the oxygen. The oxygen may be stored in one or more storage vessels, such as, for example, product tank 116, and the nitrogen may be discharged back into the room air. For example, the oxygen gas may be discharged through a port associated with product tank 116 to a patient through tubing and nasal cannula. Alternatively, the oxygen gas may be discharged through a supplemental port to an oxygen cylinder filling device, such as HOMEFILL® that is manufactured by Invacare Corp. of Elyria, Ohio, USA.

Separator bed 106 contains a separation medium or material, such as, for example, a physical separation medium. The separation material can selectively adsorb one or more adsorbable components and pass one or more nonadsorbable components of a gaseous mixture through the separator bed 106. The physical separation material may be a molecular sieve with pores of uniform size and essentially the same molecular dimensions. These pores selectively adsorb molecules in accordance with molecular shape, polarity, degree of saturation, and the like. In one embodiment, the physical separation medium is an aluminasilicate composition with 4 to 5. ANG. (Angstrom) pores. More specifically, the molecular sieve is a sodium or calcium form of aluminasilicate, such as type 5A zeolite. Alternately, the aluminasilicate may have a higher silicon-to-aluminum ratio, larger pores, and an affinity for polar molecules, e.g., type 13× zeolite. The zeolite adsorbs nitrogen, carbon monoxide, carbon dioxide, water vapor, and other significant components of air. Other types of separation media may also be used.

FIG. 1A illustrates an exemplary fill cycle of system 100 that can be used for generating concentrated oxygen gas. Pressure source or assembly 110 creates a pressure differential that draws room air through filter 102 and pushes the air through valve 104 and into separation bed 106. An absorption zone will then be created within separation bed 106, where nitrogen is absorbed and oxygen is allowed to migrate through the separation bed 106.

As the gas mixture is introduced through an inlet of an adsorbed, gas-free or regenerated separation bed 106, an adsorption zone with a finite, relatively large size is formed. This adsorption zone is a region of the separation bed 106 in which the full capacity of the adsorbent to hold the adsorbable components has not been reached. The composition of the gas in the voids of the zeolite can vary from substantially pure primary-product gas at the outlet end of the separation bed 106, to the ambient gaseous mixture composition at the inlet end of the separation bed 106.

This adsorption zone moves from the separation bed 106 inlet toward the separation bed 106 outlet with a velocity significantly less than the superficial gas velocity in the separation bed 106. When the adsorption zone reaches the outlet end of the separation bed 106, adsorbable components begin to flow through the separation bed 106 outlet into the nonadsorbable primary product stream. This time is hereinafter referred to as the "breakthrough." For a given gaseous composition, the breakthrough is defined by the size and configuration of the separation bed 106 container as well as the packing configuration of the molecular sieve and the flow rate and separation bed 106 gas pressure or vacuum. The separation bed 106 container configuration is generally cylindrical, though non-cylindrical geometries can also be used. The breakthrough is the time required for the diffusion reaction as the nitrogen saturates and is weakly bonded to the separation bed 106 separation media.

When breakthrough occurs, primary product-enriched gas in the zeolite voids varies from a higher primary product gas concentration at the separation bed 106 outlet to a lower concentration at the separation bed 106 inlet. In the illustrated embodiment, the primary product-enriched bed gas is about 80 percent or more primary product at breakthrough. In embodiments with more than one separation bed 106, while adsorption is occurring in one separation bed 106, the adsorbable components adsorbed by the separation media of another separation bed 106 may purged.

During the adsorption process, the oxygen can travel through separation bed 106, valve 108, valve 114 and into product tank 116. Valve 114 can be a check valve to prevent the product gas in the product tank from flowing back through the system, for example, during a purge cycle. Control system 122 operates the valves 104, 108, 112 and pressure source 110 in this state until separation bed 106 has become saturated or nearly saturated with nitrogen. This process is hereinafter referred to as the fill or generation cycle. The time for ending the fill cycle can be determined in a number of ways, including, for example, by a timing cycle or using sensors to determine when the nitrogen within separation bed 106 is at or near the outlet of the separation bed 106. One example of sensor-based control is described in U.S. provisional patent application Ser. No. 61/608,874, filed on Mar. 9, 2012, and fully incorporated herein by reference.

The control system 122 can control a complete cycle, including both the product gas generation (e.g., fill) cycle and the purge cycle. The cycle duration can be selected or determined such that the separation bed 106 is connected with the source of air for a duration which is equal to or less than the breakthrough time.

FIG. 1B illustrates an exemplary purge or regeneration cycle that is typically performed after the fill cycle. In this mode, the air from the pressure source 110 is directed by valves 104 and 108 to the previous product gas outlet side of separation bed 106 to push the nitrogen out of the other side of the separation bed 106. Valve 112 directs the exiting nitrogen gas to atmosphere through a muffler 118. Control system 122 operates the valves and pressure source 110 in this state until separation bed 106 has been evacuated of all or a substantial amount of nitrogen. Similar to the fill cycle, the time for determining the end of the purge cycle can be determined by a timing cycle or using sensors. As mentioned above, an example of a sensor-based control is described in U.S. provisional patent application Ser. No. 61/608,874. Control system 122 may utilize various control schemes to optimize the production of concentrated product gas by controlling the activation, levels, and relative timing of pressure source 110 and valves 104, 108, and 112.

Figure 2A:
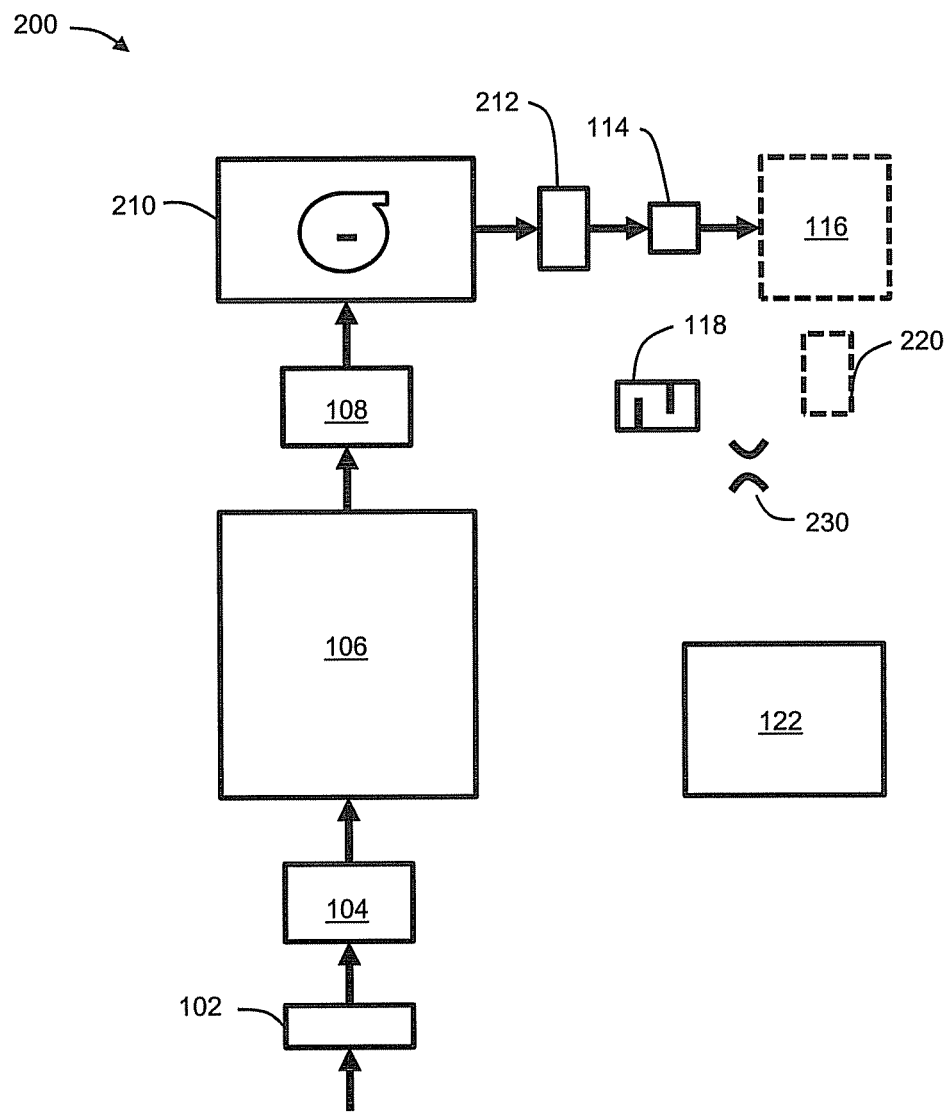
Figure 2B:
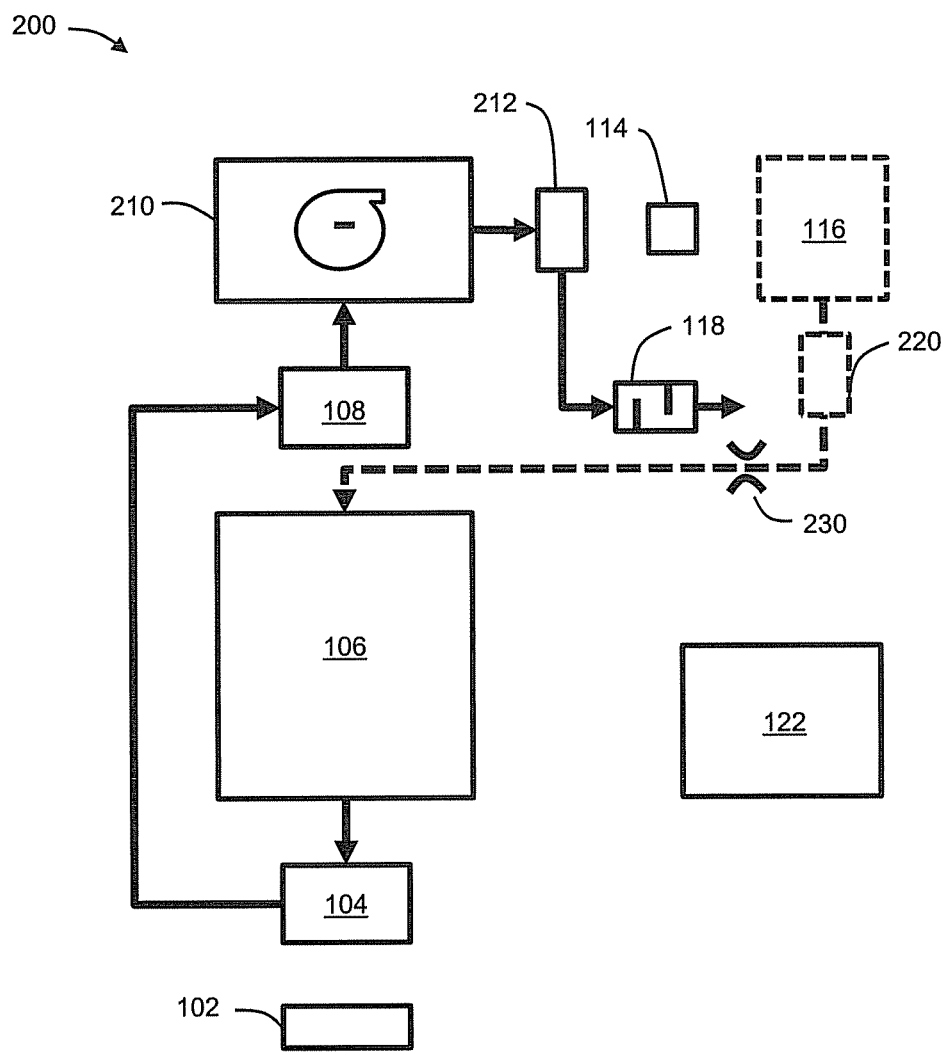

FIGS. 2A and 2B show another exemplary embodiment of a gas concentrating system 200 using vacuum swing adsorption (VSA). System 200 includes a filter 102, valves 104, 108, 212, and 114, separation bed 106, vacuum source or assembly 210, muffler 118 and a processor-based control system 122. These components may also work to provide a concentrated gas such as, for example, oxygen, to a product tank 116 or other product distribution components. Another valve 220 may also be included in the system 200, as described in detail below.

In operation, a pressure source 110 and a vacuum source 210 may be embodied with a similar component capable of creating a pressure differential across its input and output ports. In the various embodiments described herein, pressure sources (+) and vacuum sources (−) are defined by their relationship to another component. For example, pressure sources typically "push" gas through a separation bed or another component and vacuum sources typically "draw" gas through a separation bed or another component. However, when active, a pressure source and a vacuum source are both "pushing" gas at one port while "drawing" gas from the other port.

System 200 also intakes room air and separates the nitrogen from the oxygen. Like system 100, the oxygen may be stored in one or more storage tanks 116 and the nitrogen can be discharged back into the room air.

FIG. 2A illustrates an exemplary fill cycle of system 200, which is used for generating concentrated oxygen gas. Vacuum source or assembly 210 creates a vacuum that draws room air into filter 102 through valve 104 and into separation bed 106. An absorption zone will then be created within separation bed 106. The oxygen can travel through separation bed 106, valve 108, vacuum source or assembly 110, valves 212 and 114 and into product tank 116.

Control system 122 operates the valves 104, 108, 212 and vacuum source 210 in this state until separation bed 106 has become saturated or nearly saturated with nitrogen during the fill or generation cycle.

FIG. 2B illustrates an exemplary purge or regeneration cycle that can be performed after the fill cycle. In this mode, the vacuum from vacuum source 210 can be directed by valves 104 and 108 to the input side of separation bed 106 to draw the nitrogen out of the bed. Valve 212 can direct the drawn nitrogen gas to atmosphere through a muffler 118. Control system 122 operates the valves 104, 108, 212 and vacuum source 210 in this state until separation bed 106 has been evacuated of all or a substantial amount of nitrogen.

FIG. 2B also includes optional exemplary bleed valve 220 and fixed orifice 230, shown in FIG. 2B with dashed lines. During the purge cycle, a relatively small amount of oxygen product gas may be fed into the separation bed 106 from product tank 116 through bleed valve 220. The bleed flow path from the product tank 116 to the separation bed 106 may also include an optional fixed orifice 230 to regulate the bleed flow at a level not detrimental to providing the product gas to the user. This bleed flow can assist purging the separation bed 106 of nitrogen and can preload or pre-charge separation bed 106 with oxygen near its output side so that during the subsequent fill cycle through separation bed 106 (in the opposite direction), a flow of oxygen will immediately or nearly immediately commence from the separation bed 106. In one embodiment, the bleed flow is provided near the end of the purge cycle and can vary in time length. In another embodiment, the bleed flow may be provided throughout a large portion of the purge cycle. In other embodiments, a continuous bleed flow may be provided without valve control (not shown), which may also be in addition to the selective bleed flow controlled by bleed valve 220.

Figure 2C:
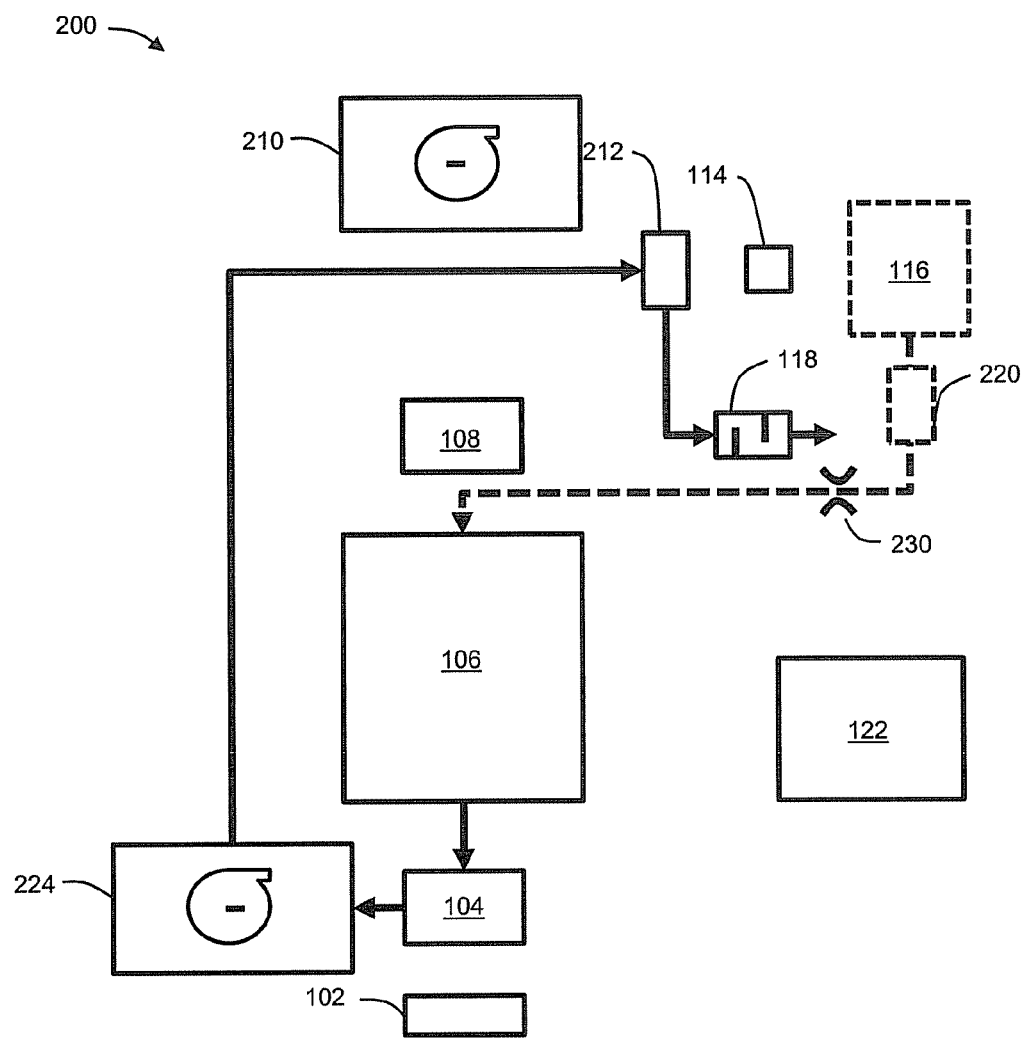

FIG. 2C illustrates another exemplary embodiment of the purge cycle similar to FIG. 2B and including a second vacuum source 224. In this embodiment, vacuum source 210 can be utilized during the fill cycle as described in connection with FIG. 2A. During the purge cycle, vacuum source 224 can be utilized as the source of vacuum in connection with valve 104 to draw nitrogen out of the separation bed 106 input side, through valve 212 and muffler 118 to the atmosphere. Control system 122 may utilize various control schemes to optimize the production of concentrated product gas by controlling the activation, levels, and relative timing of vacuum sources 210, 224, and valves 104, 108, 212, and 220.

Figure 3A:
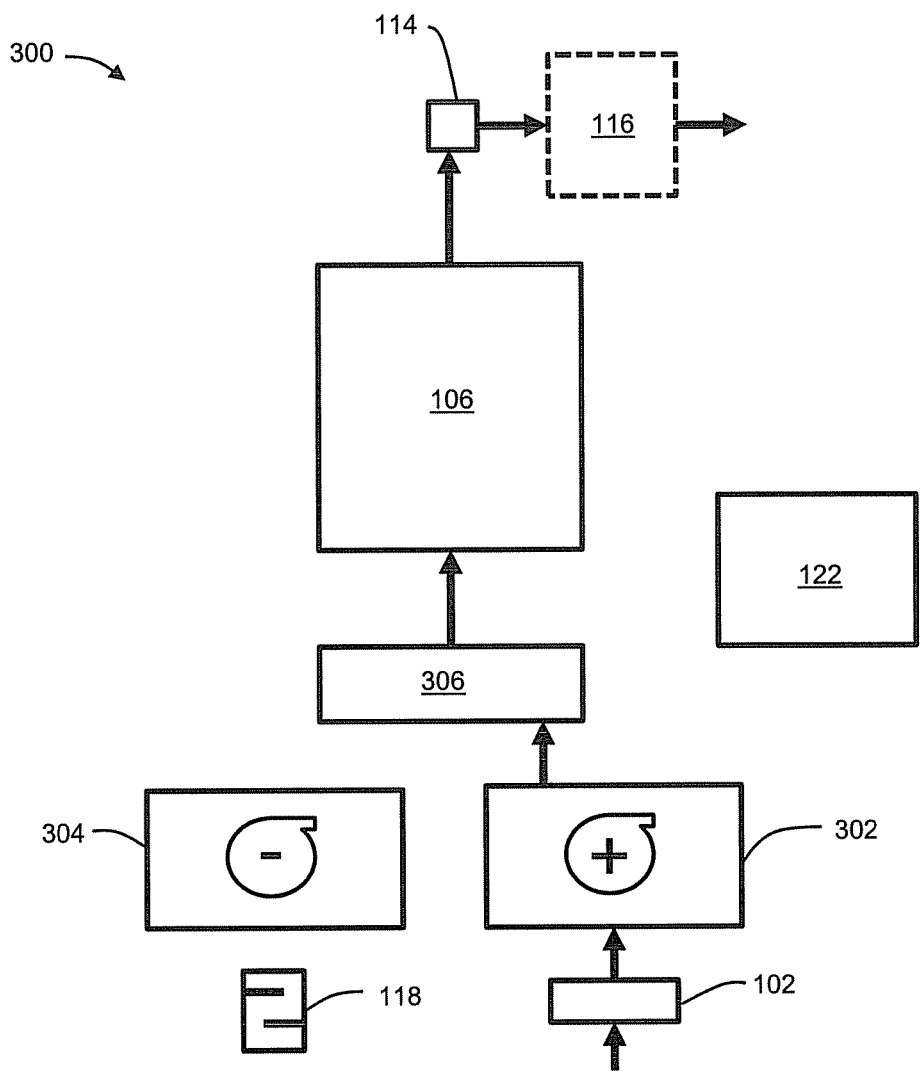
Figure 3B:
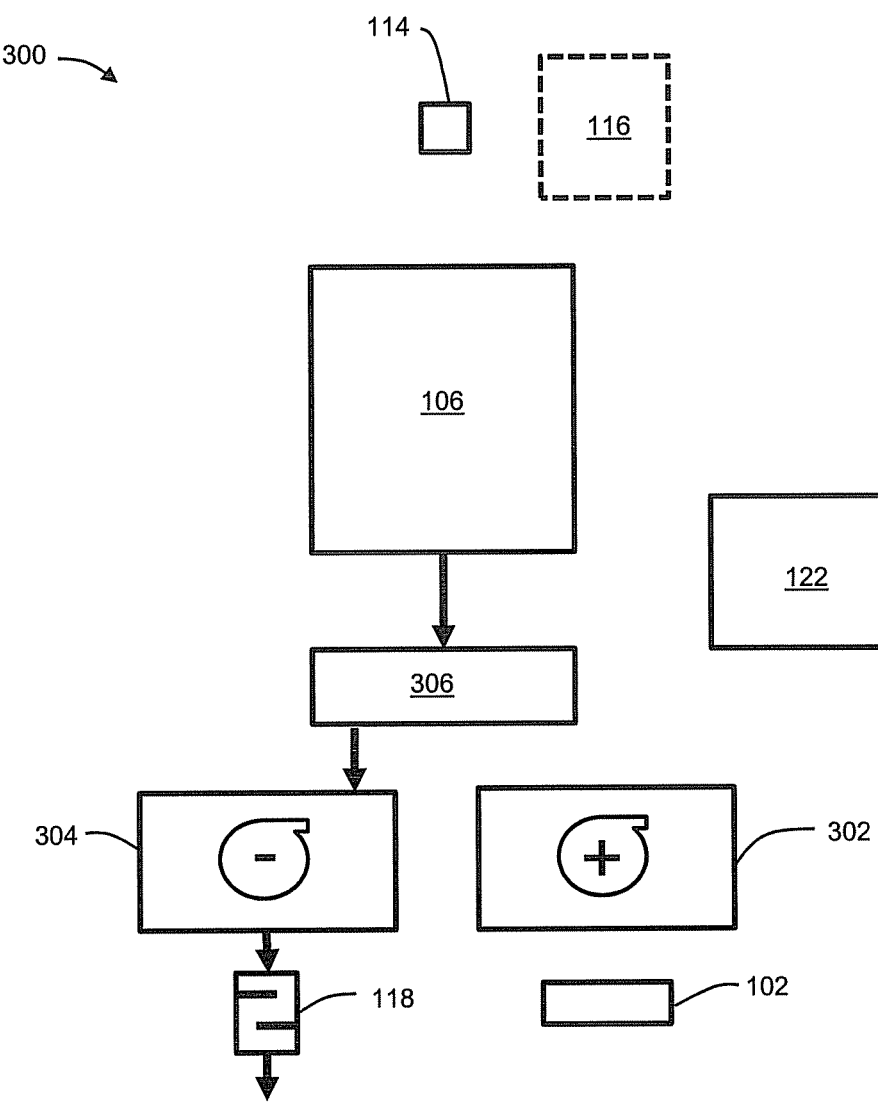

FIGS. 3A and 3B illustrate another exemplary embodiment of a gas concentrating system 300 using elements from both PSA and VSA, also known as a vacuum pressure swing absorption (VPSA) system. System 300 includes pressure source 302, vacuum source 304, multi-way valve 306, separation bed 106, valve 114, product tank 116, and control system 122. FIG. 3A illustrates an exemplary fill cycle where pressure source 302 is used provide room air through filter 102 and valve 306 into separation bed 106, which produces oxygen at its output, and into optional product tank 116. FIG. 3B illustrates an exemplary purge cycle where vacuum source 304 uses a vacuum to draw nitrogen gas out from the input side of the separation bed 106 and vents it to atmosphere through a muffler. The purge cycle shown in FIG. 3B may also include one or more bleed flows of oxygen from the product tank 116 to the separation bed 106, as described above with reference to FIG. 2B. Both the fill and purge cycles are controlled by control system 122 so that during the fill cycle only oxygen gas exits the separation bed 106 and the separation bed 106 is appropriately purged by switching the control shown in FIG. 3B. Control system 122 may utilize various control schemes to optimize the production of concentrated product gas by controlling the activation, levels, and relative timing of pressure source 302, vacuum source 304, and valve 306.

FIG. 4 illustrates another exemplary embodiment of a gas concentrating system 400 using VPSA. System 400 is similar to system 300 and includes multiple separation beds 106a and 106b. In embodiments with more than one separation bed 106, one separation bed 106 may be undergoing a fill cycle while another separation bed 106 is undergoing a purge cycle at the same time. As shown in FIG. 4A, during an exemplary fill cycle of separation bed 106a, pressure source 402 provides room air through filter 102 and valve 406 into separation bed 106a, which produces oxygen at its output and into product tank 116 through valve 114a.

While separation bed 106a is undergoing the fill cycle, separation bed 106b may be undergoing the purge cycle. During the purge cycle, vacuum source 404 can draw nitrogen gas out of separation bed 106b through valve 406 and out to atmosphere through muffler 118. As described in previous embodiments, during the purge cycle, an amount of oxygen from separation bed 106a or product tank 116 can be fed back into separation bed 106b to preload or pre-charge the separation bed 106b, as controlled by the optional bleed valve 420 and fixed orifice 430.

Figure 4A:
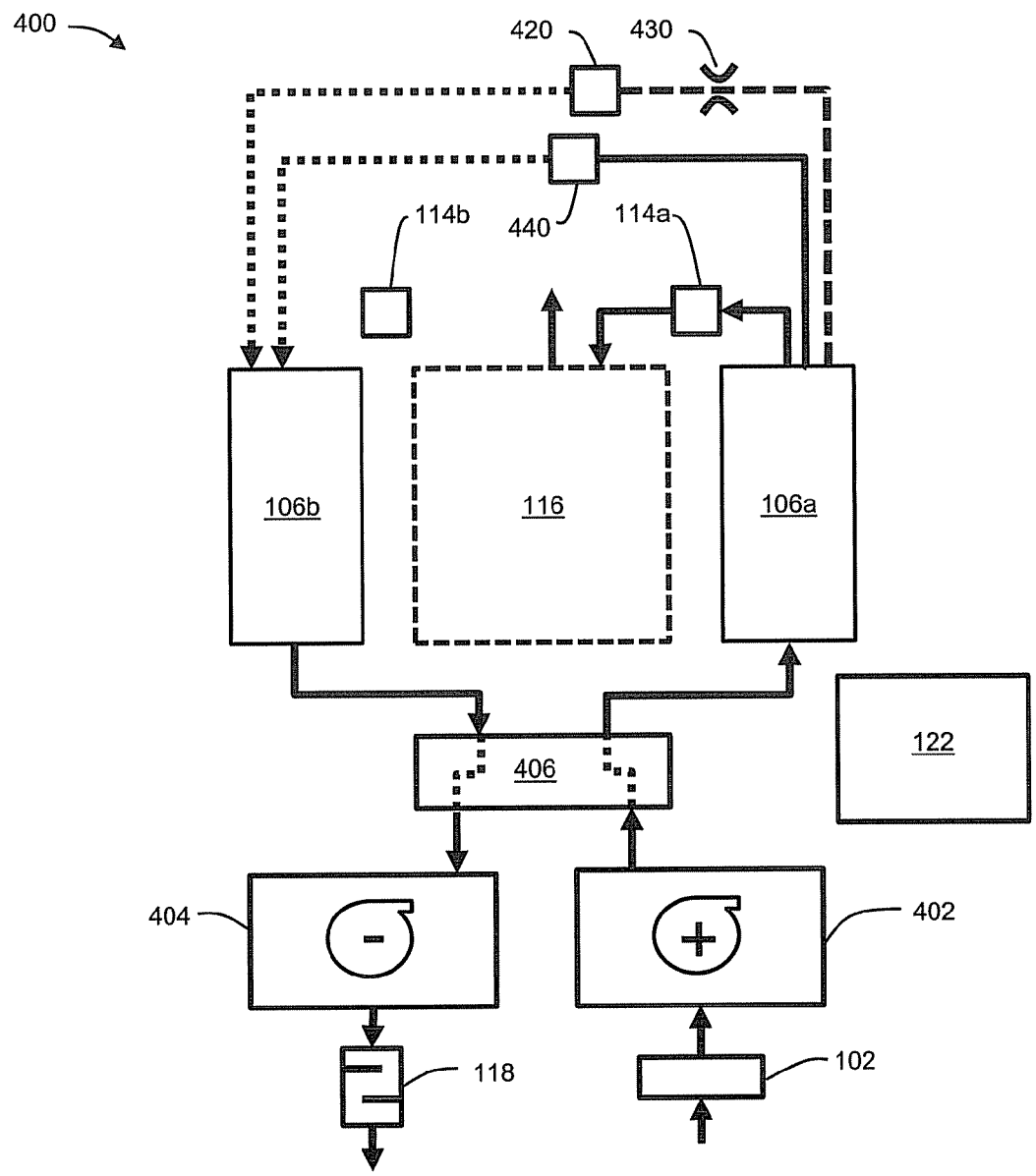
Figure 4B:
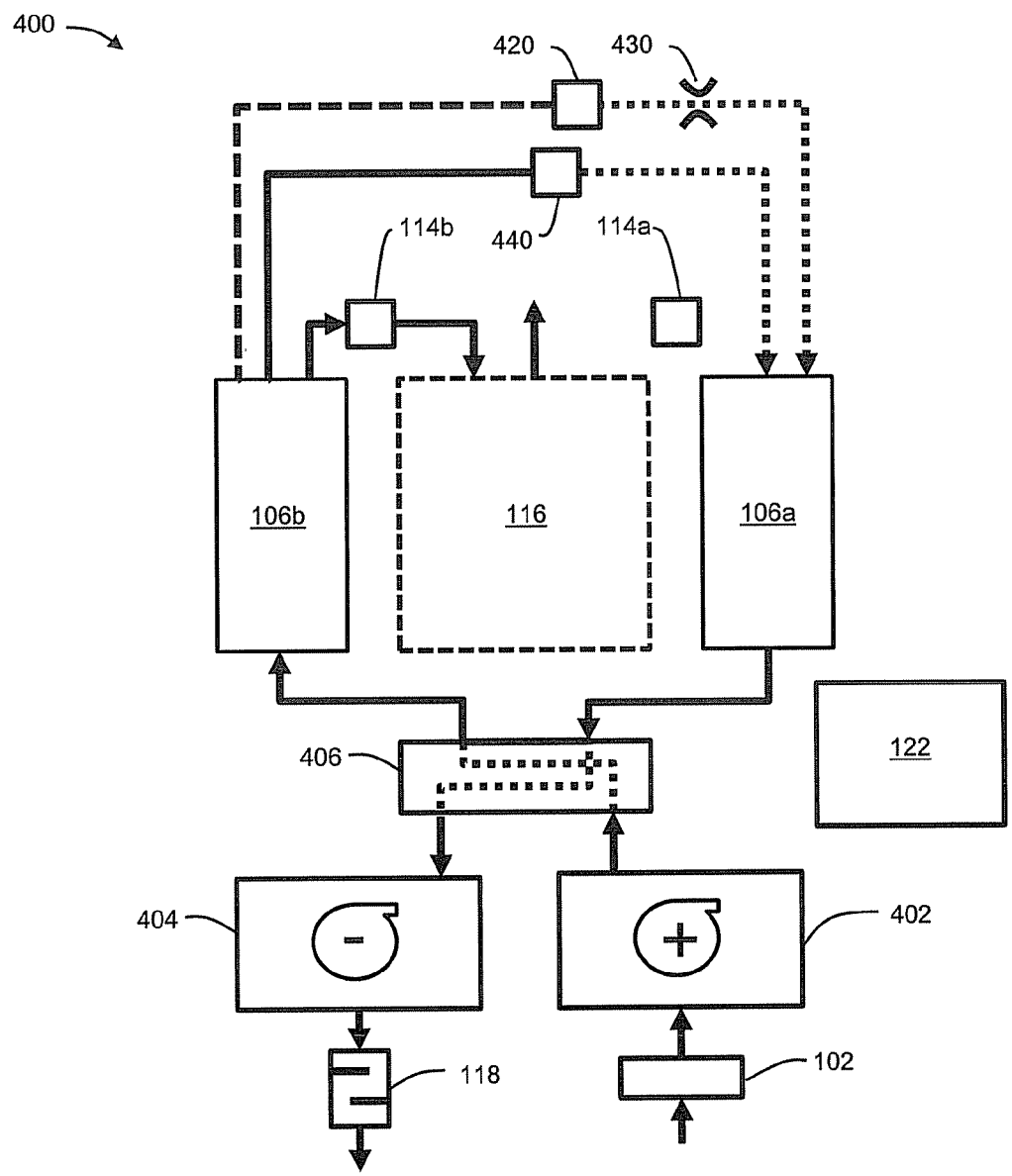

As shown in FIG. 4B, once separation bed 106a has been filled and/or separation bed 106b has been purged, control system 122 switches valve 406 so that separation bed 106b enters the fill cycle while separation bed 106a enters the purge cycle. In this state, pressure source 402 directs room air into separation bed 106b, which produces oxygen at its output and into product tank 116 through valve 114b. Vacuum source 404 simultaneously draws nitrogen out of separation bed 106a. Oxygen from separation bed 106b or product tank 116 can be fed back into separation bed 106a to preload or pre-charge the separation bed 106a, as controlled by the optional bleed valve 420 and fixed orifice 430, now flowing in the opposite direction as compared to the previous cycle. In this manner, each separation bed 106a, 106b cyclically undergoes alternating fill and purge cycles as controlled by controller 122.

The exemplary VPSA system 400 also includes an exemplary pressure equalization valve 440. The pressure equalization valve 440 can allow for a more efficient generation of oxygen by equalizing the pressure between the outputs of a separation bed 106 nearing the end of its fill cycle and a separation bed 106 nearing the end of its purge cycle. For example, in this embodiment, pressure equalization valve 440 may be activated to equalize the pressure between the outputs of separation bed 106a and separation bed 106b near the end of each purge/fill cycle. U.S. Pat. Nos. 4,449,990 and 5,906,672, which are fully incorporated herein by reference, further describe the operation of pressure equalization valves. Control system 122 may utilize various control schemes to optimize the production of concentrated product gas by controlling the activation, levels, and relative timing of pressure source 402, vacuum source 404, and valves 406, 420, and 440.

Figure 4C:
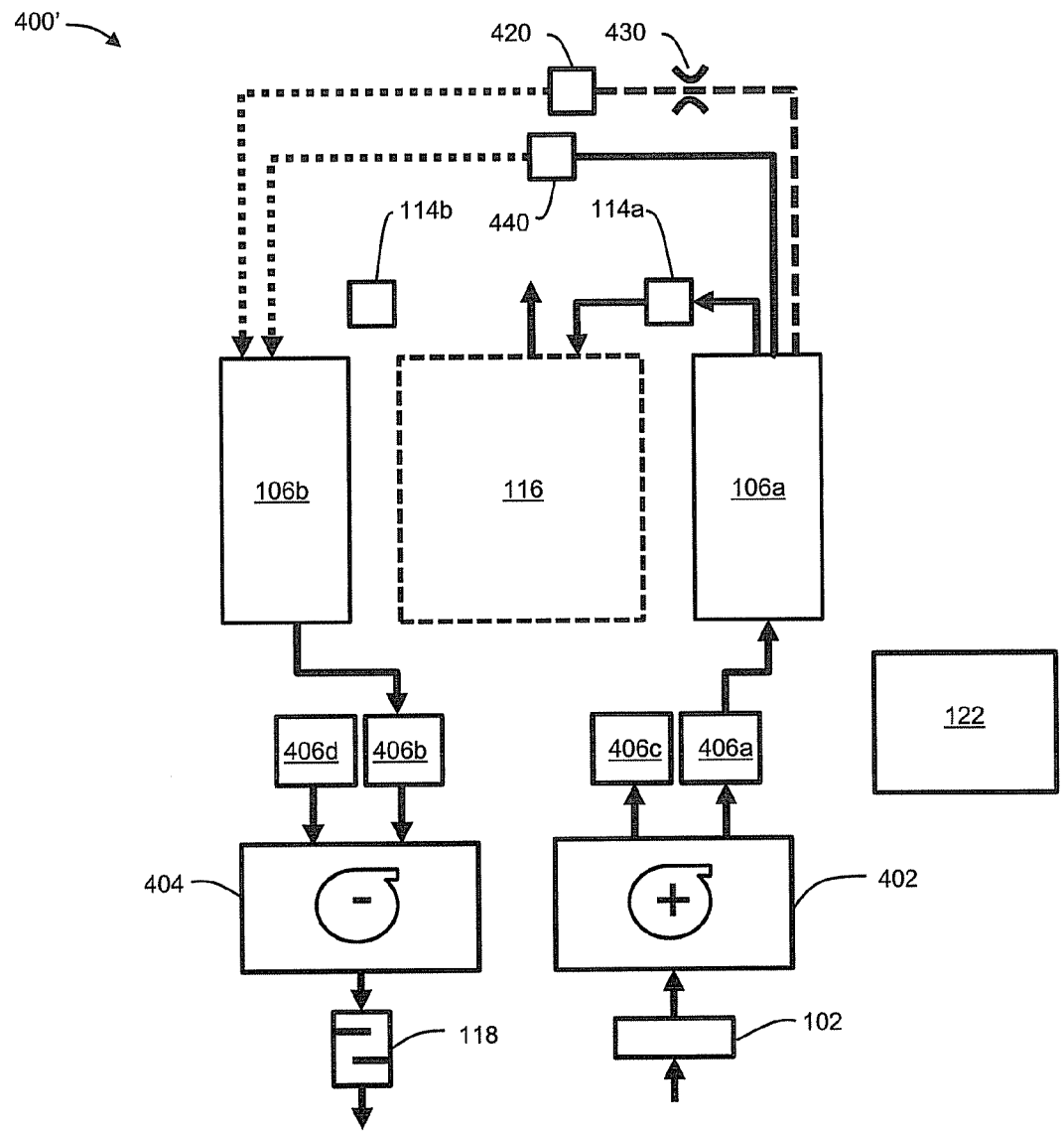
Figure 4D:
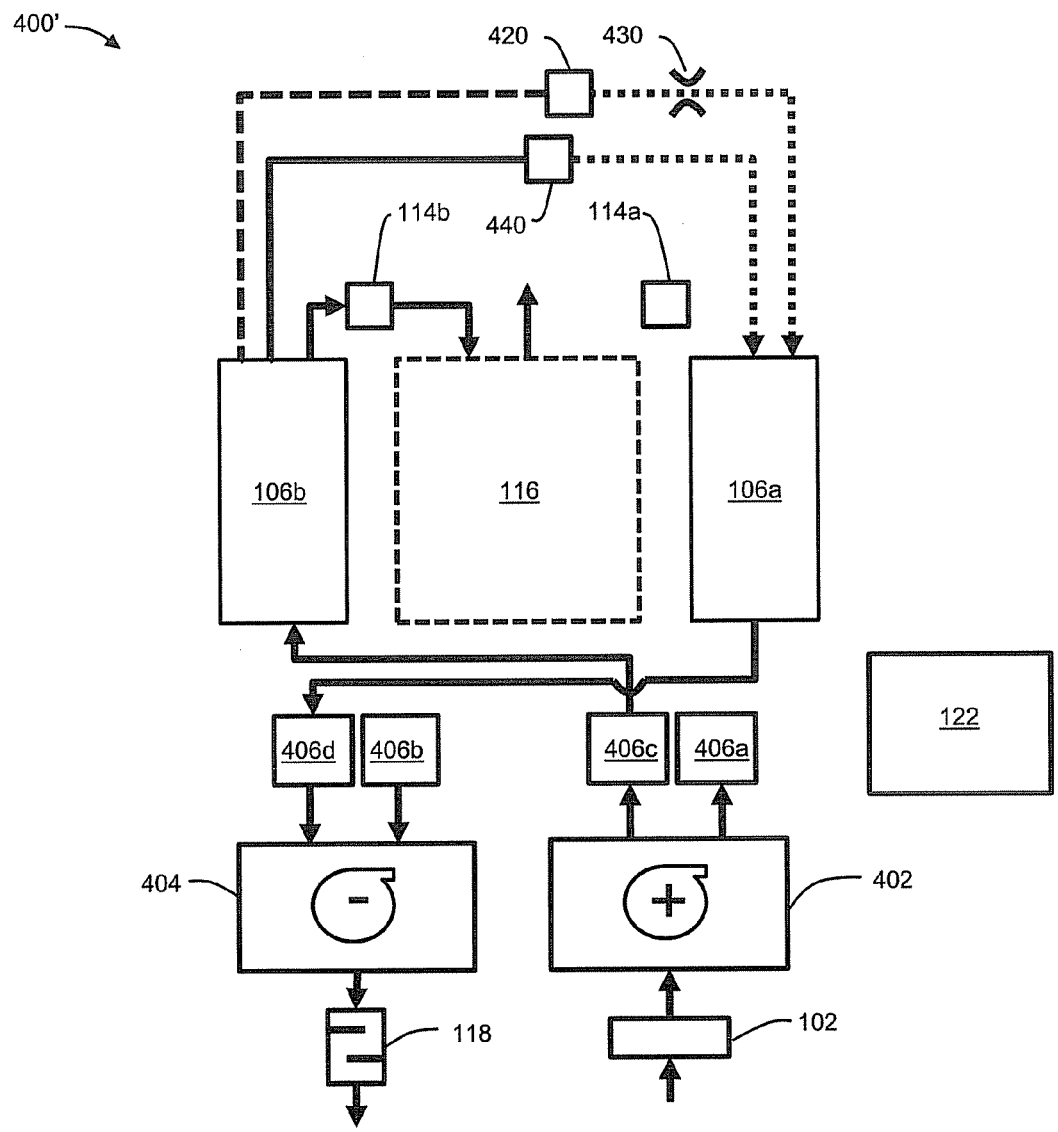

FIGS. 4C and 4D illustrate another exemplary embodiment of a gas concentrating system 400' using VPSA. System 400' is similar to system 400 and includes multiple valves 406a, 406b, 406c, and 406d. Operation of the fill and purge cycles for separation beds 106a and 106b in system 400' are similar to those described for system 400, but independent valves 406a, 406b, 406c, and 406d allow the control system 122 to independently control the switching of the various flow paths between the pressure source 402, vacuum source 404, and separation beds 106a, 106b. In some embodiments, the timing of switching these various flow paths may not be simultaneous. For example, in one embodiment, corresponding valves 406a and 406b may not switch on or off at the same time.

In this embodiment, control system 122 may utilize various control schemes to optimize the production of concentrated product gas by controlling the activation, levels, and relative timing of pressure source 402, vacuum source 404, and valves 406a, 406b, 406c, 406d, 420, and 440. As mentioned above, these control schemes may also respond to other devices, such as, for example, various inputs and sensors. Optimizing the production of concentrated product gas may be based on various factors, including, for example, product gas production volume, product gas purity level, energy usage, noise levels, etc. Control schemes may also vary based on various operating conditions, such as, for example, product gas usage rate, product gas usage pressure, ambient temperature, ambient pressure/altitude, battery power level, etc.

Figure 5:
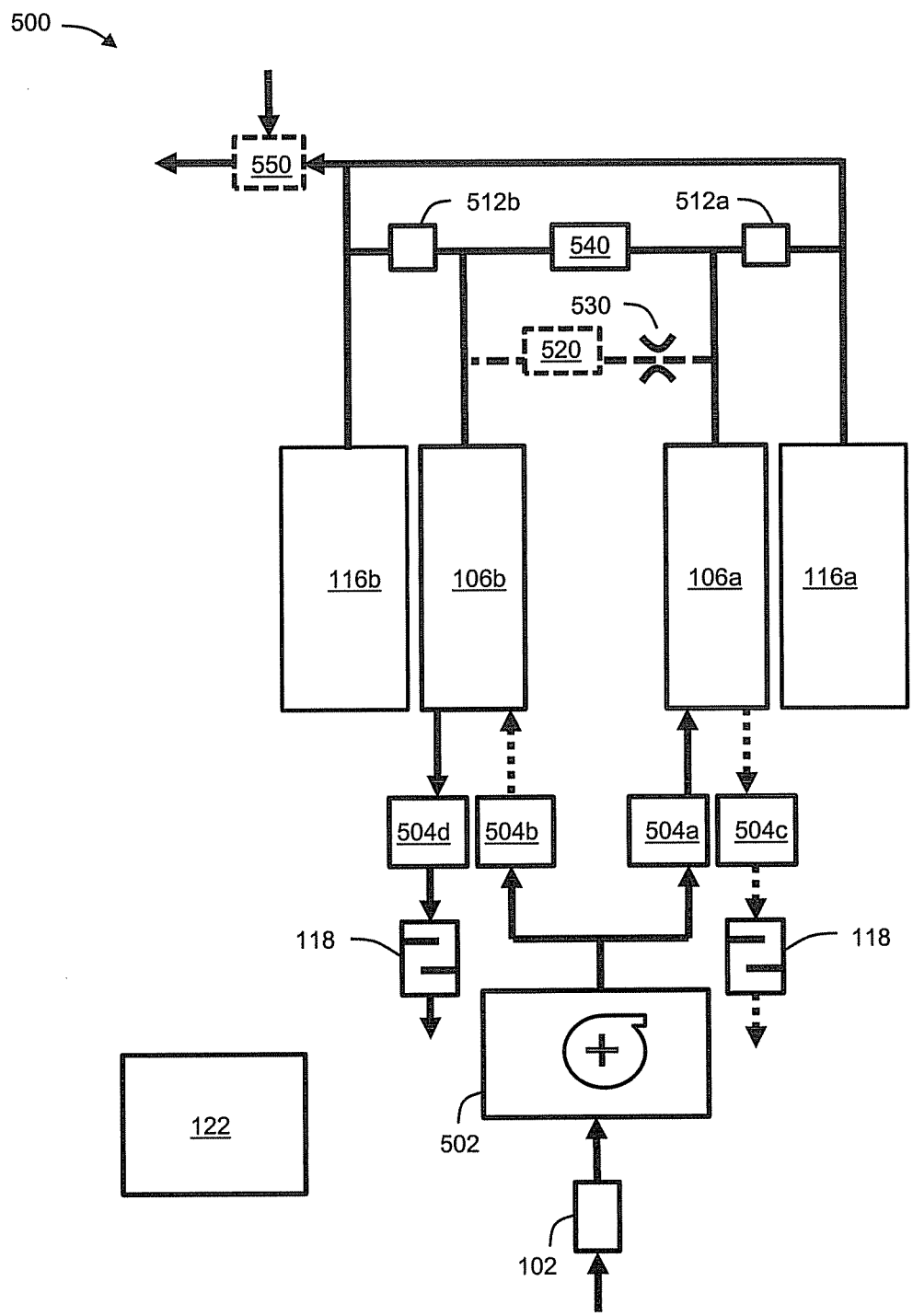

FIG. 5 illustrates another exemplary embodiment of a gas concentrating system 500 using PSA. System 500 is similar to system 400 and 400', includes multiple separation beds 106a and 106b, includes multiple valves 504a, 504b, 504c, and 504d, and includes multiple product tanks 116a, 116b and a conserver valve 550. In this embodiment, product tanks 116a, 116b are shown connected in a manner such that they act as one product tank 116. In one embodiment, system 500 includes modular separation bed 106a/product tank 116a and separation bed 106b/product tank 116b assemblies. As shown by the solid lines in FIG. 5, during an exemplary fill cycle of separation bed 106a, pressure source 502 provides room air through filter 102 and valve 504a into separation bed 106a, which produces oxygen at its output and into product tanks 116a, 116b through valve 512a. Valves 512a and 512b may be check valves.

While separation bed 106a is undergoing the fill cycle, separation bed 106b may be undergoing the purge cycle. During the purge cycle, pressurized separation bed 106b expels nitrogen gas through valve 504d and out to atmosphere through muffler 118. Separation bed 106b is pressurized from its previous fill cycle. As described in previous embodiments, during the purge cycle, an amount of oxygen from separation bed 106a or product tanks 116a, 116b can be fed into separation bed 106b to preload or pre-charge the separation bed 106b, as controlled by the optional bleed valve 520 and fixed orifice 530, shown in FIG. 5 with dashed lines.

As shown by the dotted lines in FIG. 5, once separation bed 106a has been filled and/or separation bed 106b has been purged, control system 122 switches valves 504a, 504b, 504c, and 504d so that separation bed 106b enters the fill cycle while separation bed 106a enters the purge cycle. In this state, pressure source 502 directs room air into separation bed 106b, which produces oxygen at its output and into product tanks 116a, 116b through valve 512b. During the purge cycle, an amount of oxygen from separation bed 106b or product tanks 116a, 116b can be fed into separation bed 106a to preload or pre-charge the separation bed 106a, now flowing in the opposite direction as compared to the previous cycle. The exemplary PSA system 500 also includes an exemplary pressure equalization valve 540, which functions in a manner similar to the pressure equalization valve 440 described above. In this manner, each separation bed 106a, 106b cyclically undergoes alternating fill and purge cycles as controlled by control system 122.

As shown in FIG. 5, optional conserver valve 550 may be used to control the delivery of product gas to a user. Conserver valve may switch between providing concentrated product gas from the product tanks 116a, 116b or venting to the room air. For example, the conserver valve may be used to selectively provide concentrated product gas in an amount and at a time determined by the control system 122.

In this embodiment, control system 122 may utilize various control schemes to optimize the production and delivery of concentrated product gas by controlling the activation, levels, and relative timing of pressure source 502 and valves 504a, 504b, 504c, 504d, 520, 540, and 550.

Figure 6:
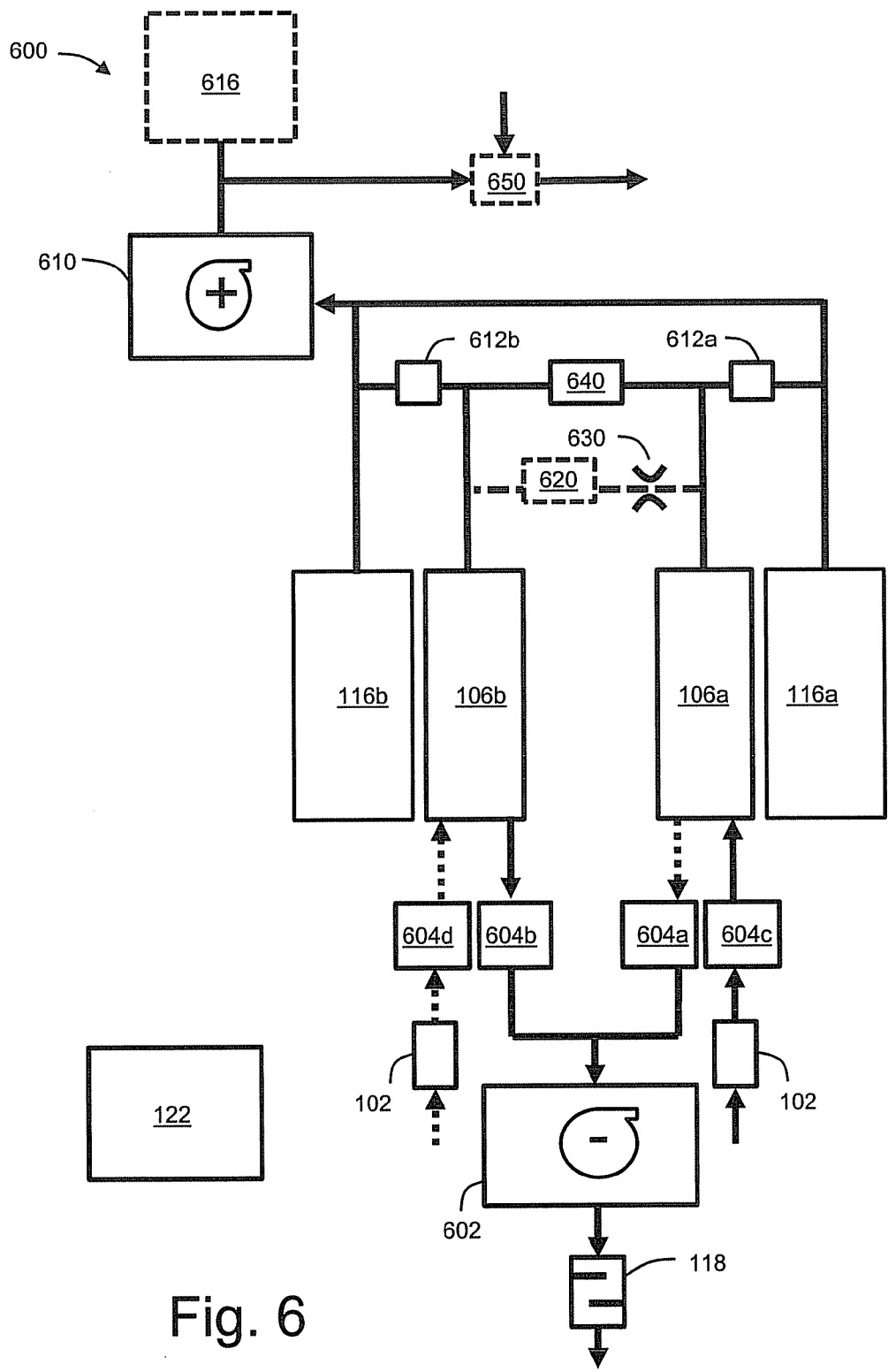

FIG. 6 illustrates another exemplary embodiment of a gas concentrating system 600 using VSA. The arrangement of system 600 is similar to PSA system 500 but operates in a manner similar to the VSA systems mentioned earlier, and includes a vacuum source 602 instead of a pressure source 502, a pressure source 610, and another optional product tank or accumulator 616. As shown by the solid lines in FIG. 6, during an exemplary fill cycle of separation bed 106a and purge cycle of separation bed 106b, vacuum source 602 draws nitrogen from separation bed 106b through valve 604b and expels the nitrogen out to atmosphere through muffler 118. Separation bed 106a produces oxygen at its output, which can flow into product tanks 116a, 116b through valve 612a. Valves 612a and 612b may be check valves.

Prior to the fill cycle, separation bed 106a was drawn down to a sub-atmospheric pressure by vacuum source 602 during a nitrogen purge cycle. To start the fill cycle, valve 604c allows room air at ambient (atmospheric) pressure to rush into separation bed 106a from filter 102 during its fill cycle. As described in previous embodiments, during the purge cycle, an amount of oxygen from separation bed 106a or product tanks 116a, 116b can be fed into separation bed 106b to preload or pre-charge the separation bed 106b, as controlled by the optional bleed valve 620 and fixed orifice 630, shown in FIG. 6 with dashed lines.

As shown by the dotted lines in FIG. 6, once separation bed 106a has been filled and/or separation bed 106b has been purged, control system 122 switches valves 604a, 604b, 604c, and 604d so that separation bed 106b enters the fill cycle while separation bed 106a enters the purge cycle. In this state, vacuum source 602 draws nitrogen from separation bed 106a through valve 604a and expels the nitrogen out to atmosphere through muffler 118. Separation bed 106b produces oxygen at its output, which can flow into product tanks 116a, 116b through valve 612b. During the purge cycle, an amount of oxygen from separation bed 106b or product tanks 116a, 116b can be fed into separation bed 106a to preload or pre-charge the separation bed 106a, now flowing in the opposite direction as compared to the previous cycle. The exemplary VSA system 600 also includes an exemplary pressure equalization valve 640, which functions in a manner similar to the pressure equalization valve 540 described above. In this manner, each separation bed 106a, 106b cyclically undergoes alternating fill and purge cycles as controlled by control system 122.

System 600 also includes pressure source 610, which may also be referred to as a scavenger pump. As described above, the VSA system 600 draws a vacuum into separation beds 106a, 106b and produces oxygen at their respective outlets during fill cycles as room air rushes into the separation beds 106a, 106b to equalize the pressure differential. Oxygen produced by the separation beds 106a, 106b and stored in product tanks 116a, 116b is at or near ambient pressure. Pressure source 610 is used to deliver the oxygen product gas to a user at a pressure above ambient pressure.

As shown in FIG. 6, an optional accumulator 616 may also be used to store excess oxygen product gas not required by the user, for example, based on the current flow rate or in conjunction with the timing of the conserver valve 650. The optional conserver valve 650 may be used to control the delivery of product gas to a user, as described above. Utilization of the pressure source 610 and accumulator 616 may be based on various factors, including minimizing total energy usage of the system 600.

In this embodiment, control system 122 may utilize various control schemes to optimize the production and delivery of concentrated product gas by controlling the activation, levels, and relative timing of vacuum source 602, pressure source 610, and valves 604a, 604b, 604c, 604d, 620, 640, and 650.

Figure 7:
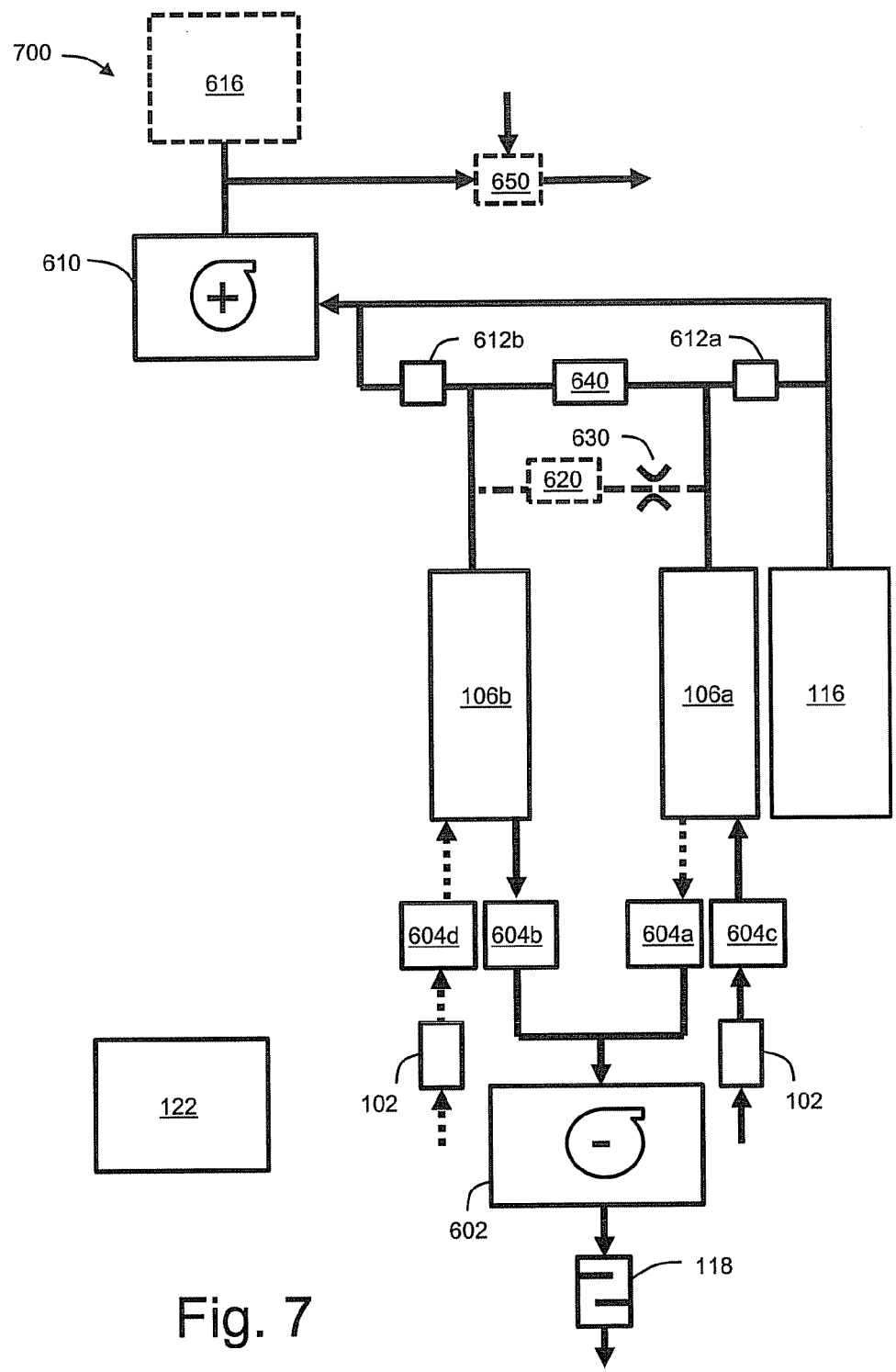

FIG. 7 illustrates another exemplary embodiment of a gas concentrating system 700 using VSA. The arrangement of system 700 is similar to VSA system 600 but only includes one product tank 116. Operation of system 700 is the same as the operation of system 600.

FIG. 8 illustrates one embodiment of a micro-pump assembly 800 that can be used as a vacuum source or a pressure source. The micro-pump assembly 800 can include one or more elements 802-806 for producing vacuum or pressure. In one embodiment, elements 802-806 can each be a piezo-driven membrane or micro-diaphragm pump.

For example, as shown in FIG. 8A, element 802 can be a micro-pump having a piezoceramic disk 810 attached to a membrane or diaphragm 820 that is capable of moving at various frequencies in response to an alternating applied voltage. In various embodiments, for example, the frequency range may be up to about 1 kHz, from about 1 kHz to several 10 kHz, or from several 10 kHz and higher. The disk-shaped piezo element 810 can be mounted directly on the pump diaphragm 820 to deflect the pump diaphragm 820 during each voltage cycle, creating pumping action that includes associated vacuums and pressures. For example, in operation, as the applied voltage on the disk-shaped piezo element 810 causes the pump diaphragm 820 to deflect up, gas can be drawn into a pump chamber 850 of the micro-pump 802 through valve 830. As the applied voltage on the disk-shaped piezo element 810 cycles, causing the pump diaphragm 820 to deflect down, gas can be pushed out of the pump chamber 850 and the micro-pump 802 through valve 840. Valves 830, 840 may be check valves or valves controlled by a control system.

In this manner, one or more elements 802 (e.g., 802-806) can be used with one another to create a range of vacuums or pressures in various series or parallel configurations. In some embodiments, individual elements 802-806 can be different than each other and may have different specifications and operating characteristics.

FIG. 9 illustrates an exemplary embodiment of a micro-pump assembly 900 that includes a plurality of micro-pumps 902-906 arranged in a series configuration, such that the output of one micro-pump is coupled to the input of another micro-pump. In this manner, the micro-pump assembly 900 can yield a pressure or vacuum that is an additive combination of the individual pressures or vacuums associated with each micro-pump 902-906.

FIG. 10 illustrates another exemplary embodiment of a micro-pump assembly 1000 that includes a plurality of micro-pumps 1002-1006 arranged in a parallel configuration, such that the outputs and inputs of the micro-pumps 1002-1006 are coupled together. In this manner, the micro-pump assembly 1000 can yield a pressure, vacuum, and/or flow rate that is an additive combination of the individual pressure, vacuum, and/or flow rates associated with each micro-pump 1002-1006.

FIG. 11 illustrates another exemplary embodiment of a micro-pump assembly 1100 that includes a plurality of micro-pumps 1102-1108 arranged in a combination series and parallel configuration. In this manner, the micro-pump assembly 1100 can yield a pressure, vacuum, and/or flow rate that is an additive combination of the individual pressure, vacuum, and/or flow rates associated with each micro-pump 1102-1108.

As can be appreciated, any number of micro-pumps can be coupled together in a micro-pump assembly using various series and/or parallel configurations to produce a wide range of pressures, vacuums, and/or flow rates. For example, micro-pump assembly 800 may be used as the various pressure sources 110, 302, 402, 502, 610 and vacuum sources 210, 224, 304, 404, 602 of the exemplary systems described above.

Figure 12:
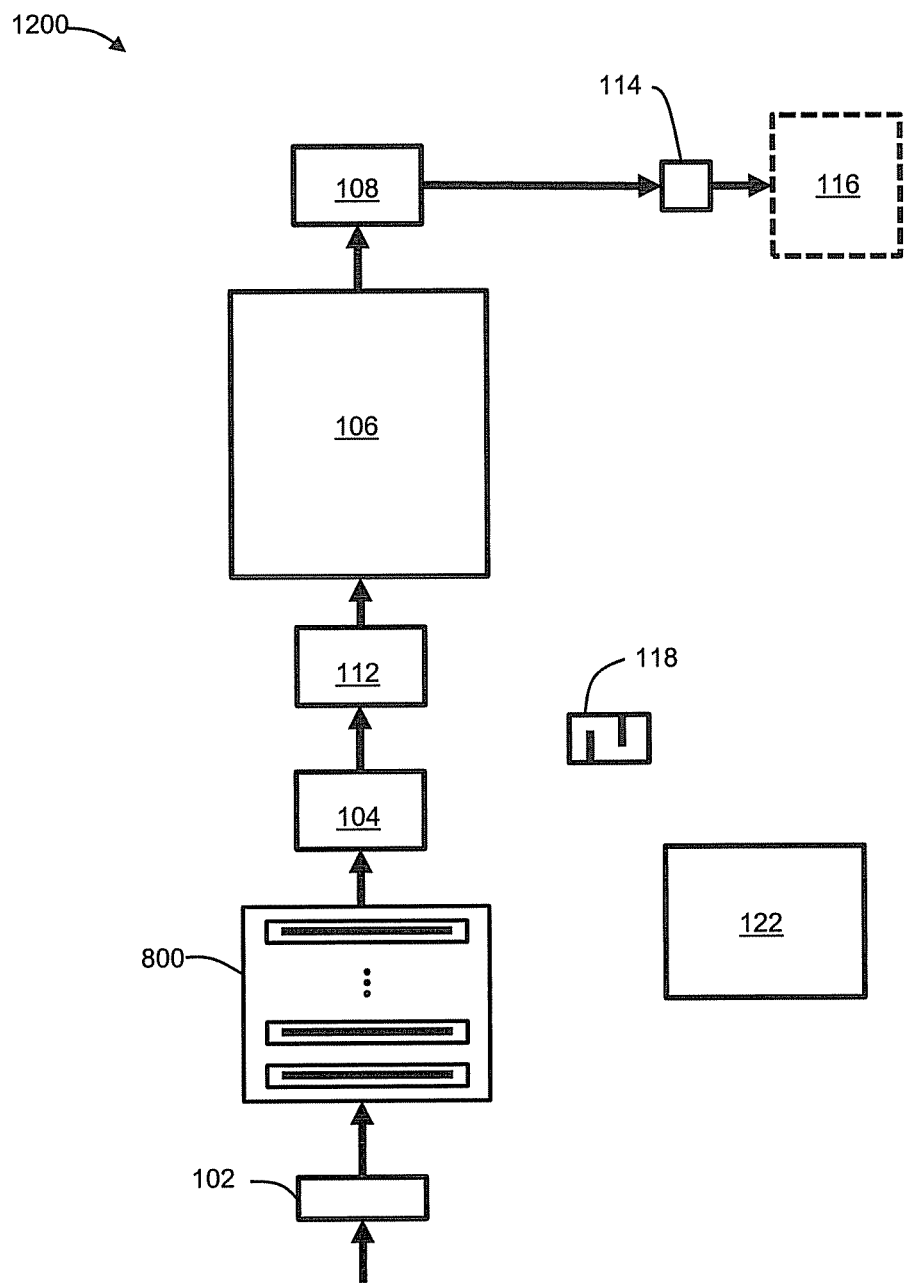
FIGS. 12-17 illustrates embodiments of gas separation systems having pressure or vacuum source assemblies that include one or more micro-pumps.
Figure 13:
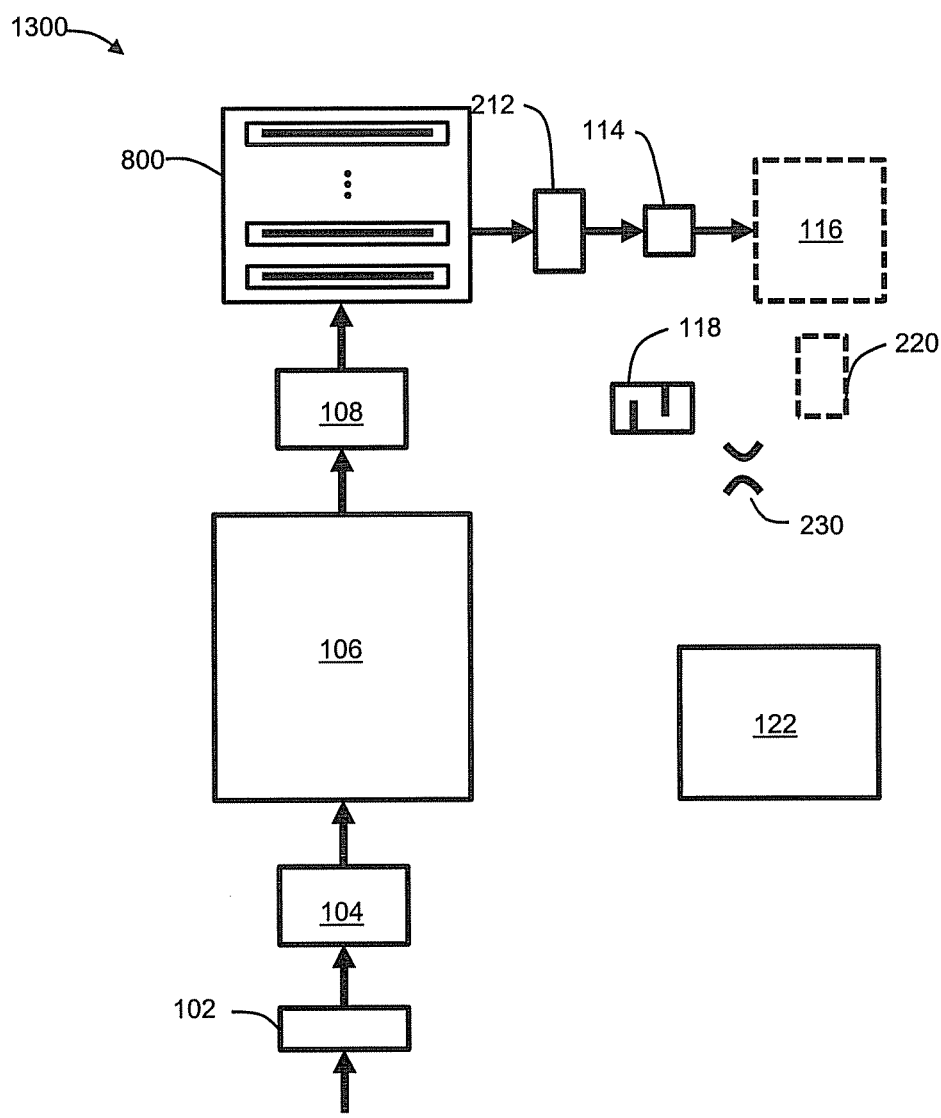
Figure 14:
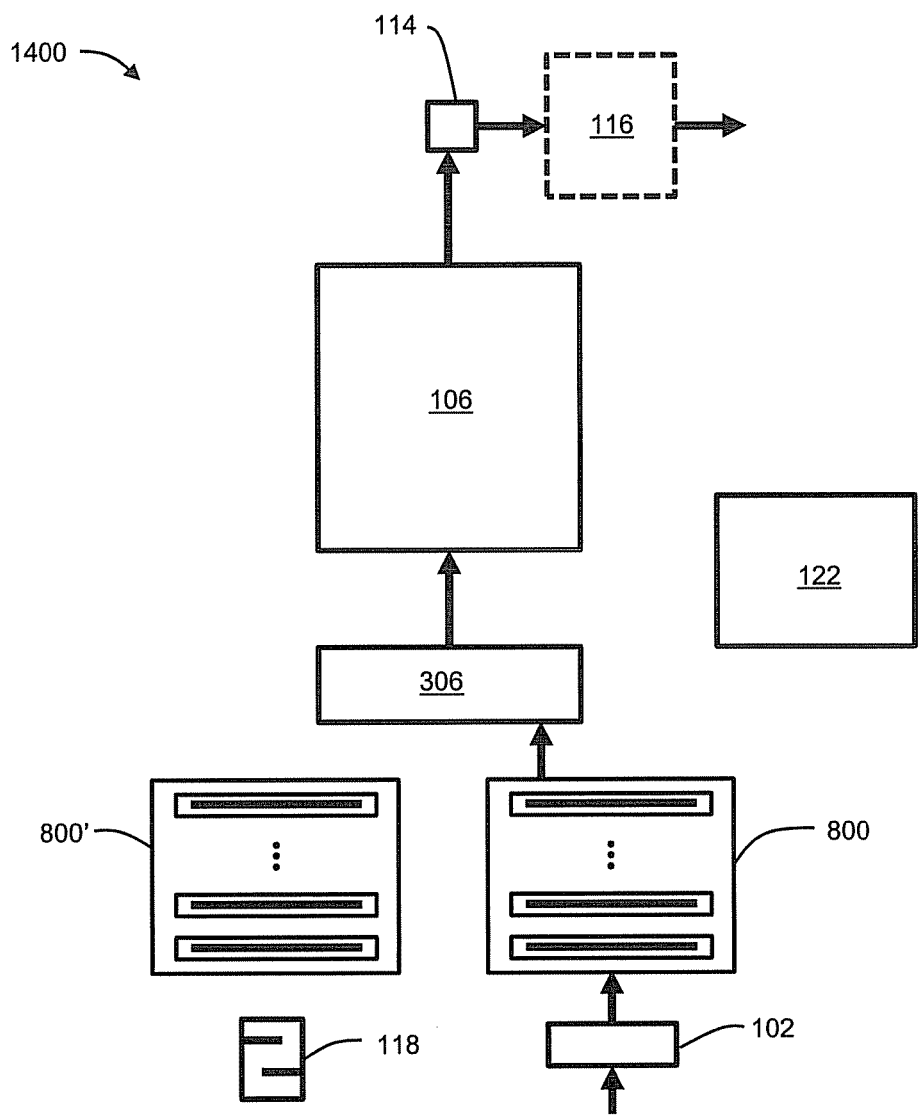
Figure 15:
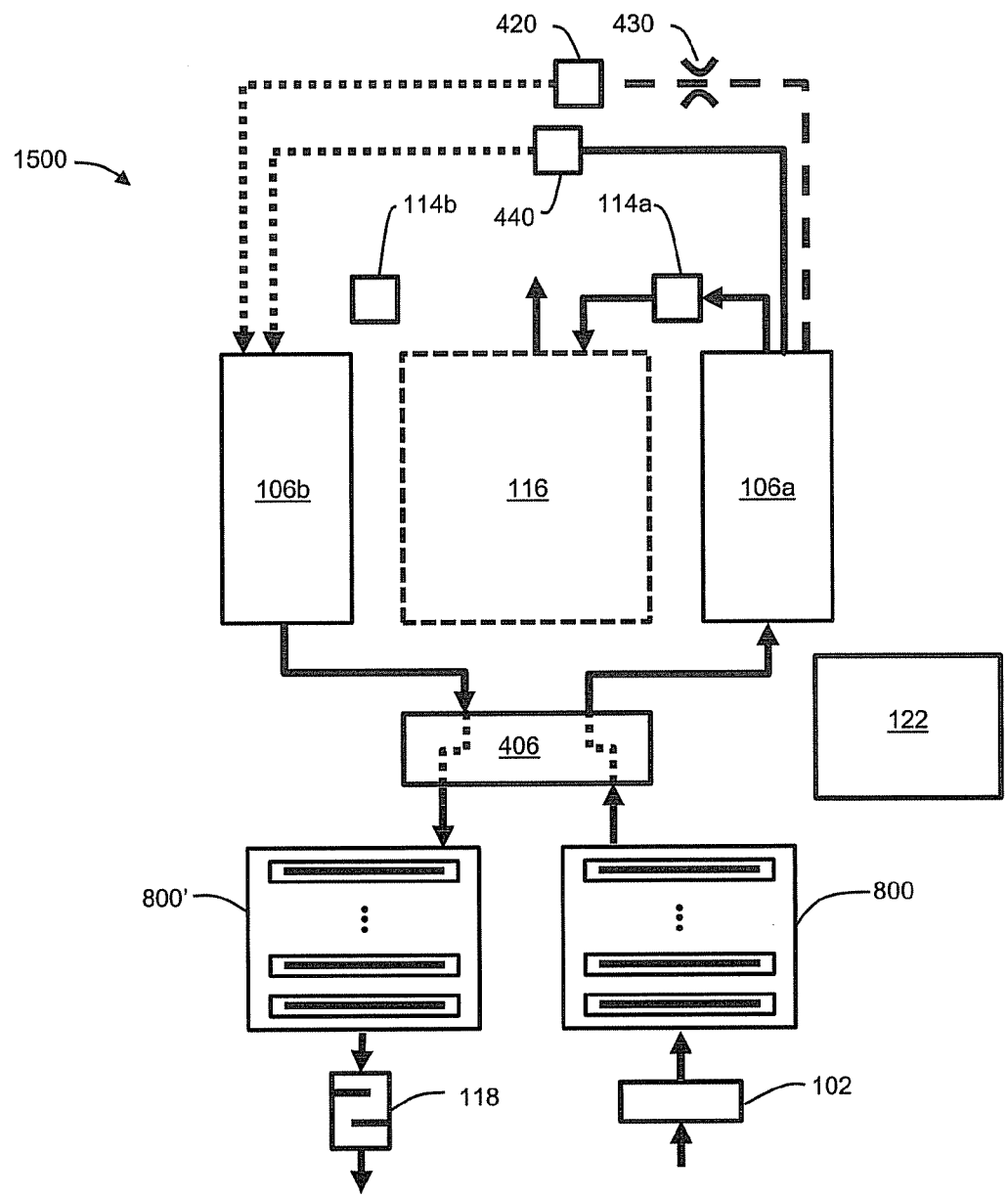
Figure 16:
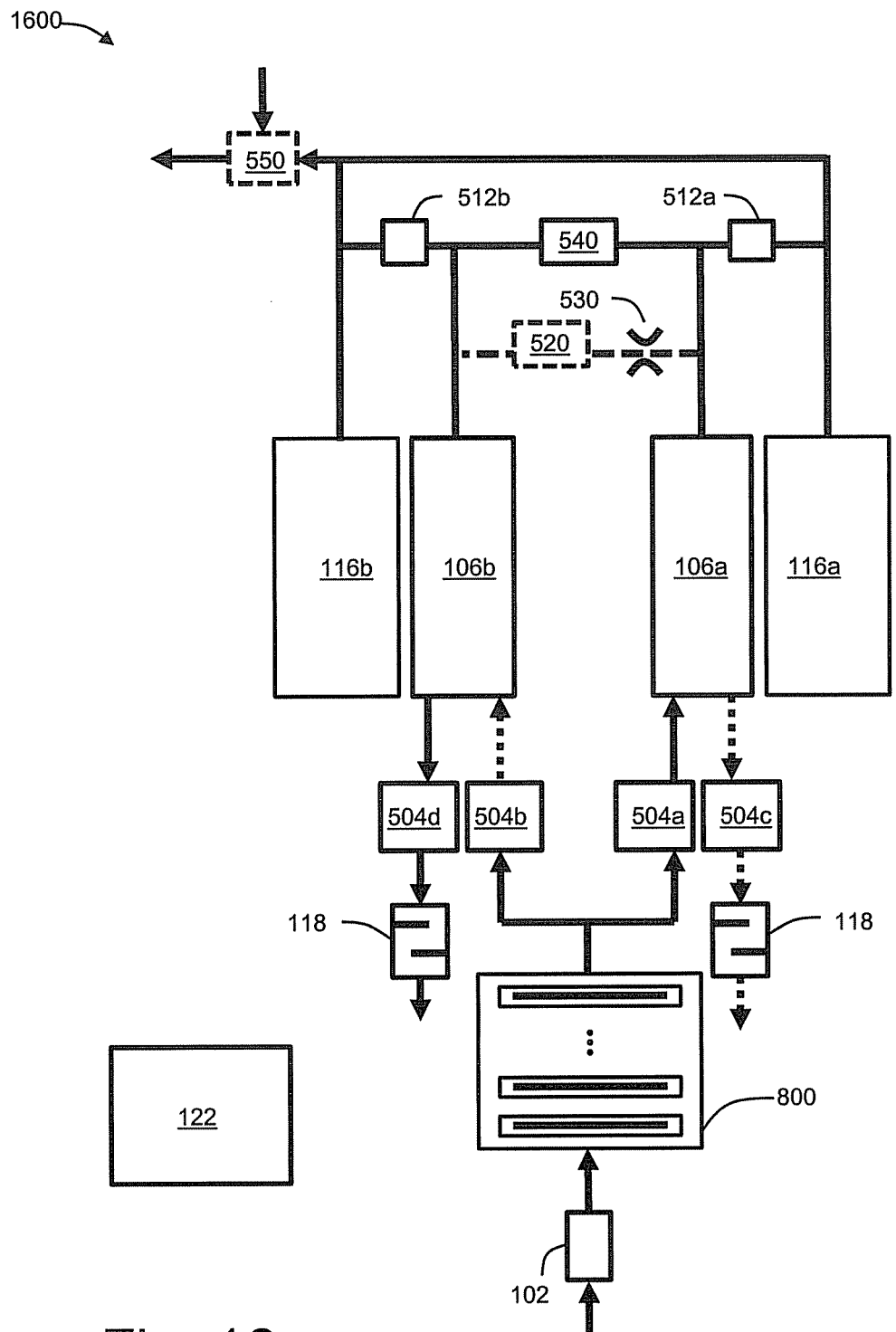
Figure 17:
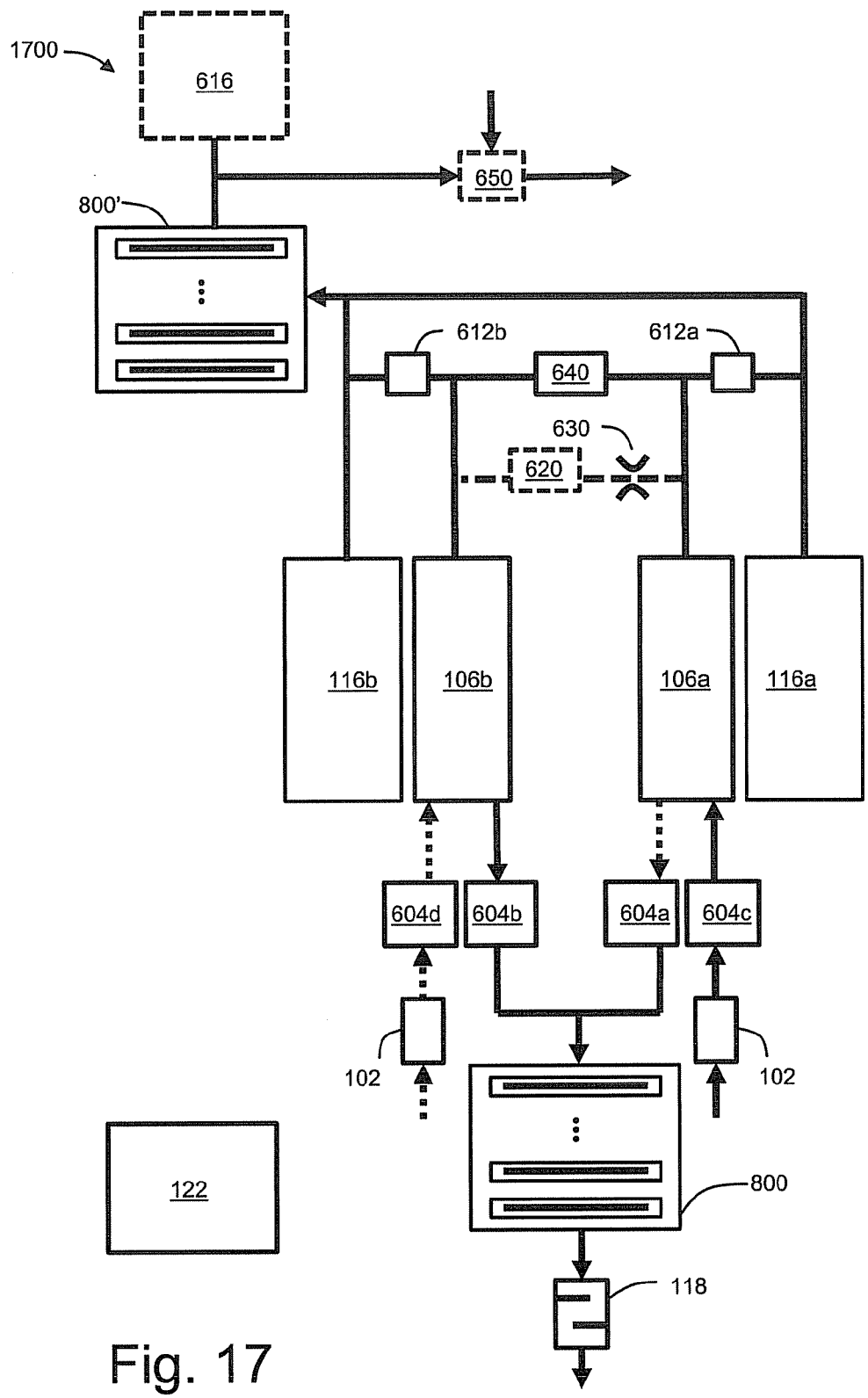

FIG. 12 shows an embodiment of an exemplary gas concentrating system 1200, similar to system 100, using PSA and a pressure source 800. FIG. 13 shows another exemplary embodiment of a gas concentrating system 1300, similar to system 200, using VSA and a vacuum source 800. FIG. 14 shows another exemplary embodiment of a gas concentrating system 1400, similar to system 300, using VPSA and a pressure source 800 and a vacuum source 800'. FIG. 15 shows another exemplary embodiment of a gas concentrating system 1500, similar to system 400, using VPSA and a pressure source 800 and a vacuum source 800'. FIG. 16 shows an embodiment of another exemplary gas concentrating system 1600, similar to system 500, using PSA and a pressure source 800. FIG. 17 shows another exemplary embodiment of a gas concentrating system 1700, similar to system 600, using VSA and a vacuum source 800 ad a pressure source 800'.

In all of the systems 1200, 1300, 1400, 1500, 1600, 1700, control system 122 may utilize various control schemes to optimize the production and delivery of concentrated product gas by controlling the activation, levels, and relative timing of pressure and vacuum sources 800, 800' along with the various associated valves mentioned above. In other embodiments, the control system 122 may also independently control the voltage applied to the piezo elements 810 and the operation of valves 830, 840 associated with each pressure and vacuum source 800, 800'.

In other embodiments, exemplary gas concentrating systems may be modular systems that can incorporate a plurality of the components of a gas concentrating system (e.g., systems 1200, 1300, 1400, 1500, 1600, 1700) into one assembly.

Figure 18A:
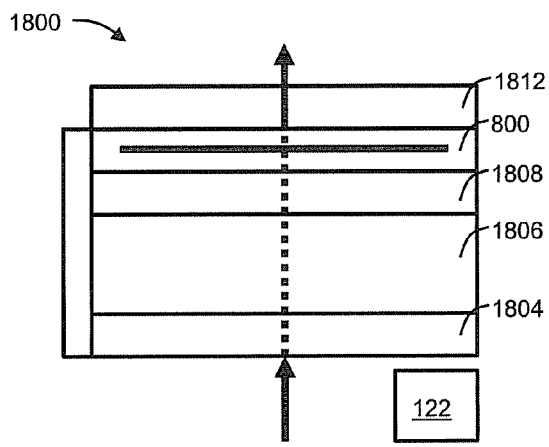
FIGS. 18A and 18B illustrate one embodiment of a vacuum source or assembly in connection with an associated separation bed.
Figure 18B:
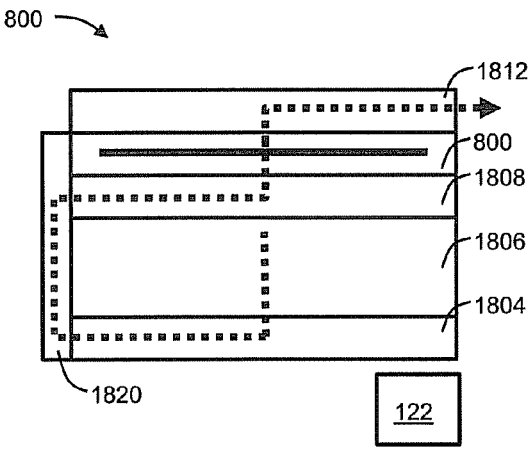

For example, FIGS. 18A and 18B illustrate an embodiment of an exemplary gas concentrating system 1800. The system 1800 is similar to separation systems shown in FIGS. 2A, 2B, and 13 and includes a VSA system having a micro-pump assembly 800 as a vacuum source and associated separation bed 1806. System 1800 also includes associated valves 1804, 1808, and 1812. In one embodiment, one or more of the system 1800 components are integrated into a common housing or structure, which can be very compact and small due to micro-pump assembly 800 being one or more micro-pumps (e.g., 802).

In operation, oxygen is produced during the fill cycle shown in FIG. 18A. During the fill cycle, vacuum source/micro-pump assembly 800 draws air into separation bed 1806 through valve 1804. In separation bed 1806, oxygen is allowed to pass while nitrogen is not due to the presence of an adsorbent material having an affinity for nitrogen. Oxygen is drawn out of separation bed 1806 and through valve 1808 and assembly 800 and out through valve 1812. When separation bed 1806 has reached its capacity, or nearly its capacity, the fill cycle ends as controlled by control system 122.

FIG. 18B illustrates the purge cycle for separation bed 1806. During the purge cycle, valves 1804 and 1808 direct a vacuum generated by assembly 800 into the input side of separation bed 1806 to draw nitrogen out of the separation bed 1806 through a flow path 1820. The nitrogen is drawn out of separation bed 1806 and through assembly 800 and out to atmosphere through valve 1812. After purging, the separation bed 1806 is ready for another fill cycle, as controlled by control system 122.

Figure 19:
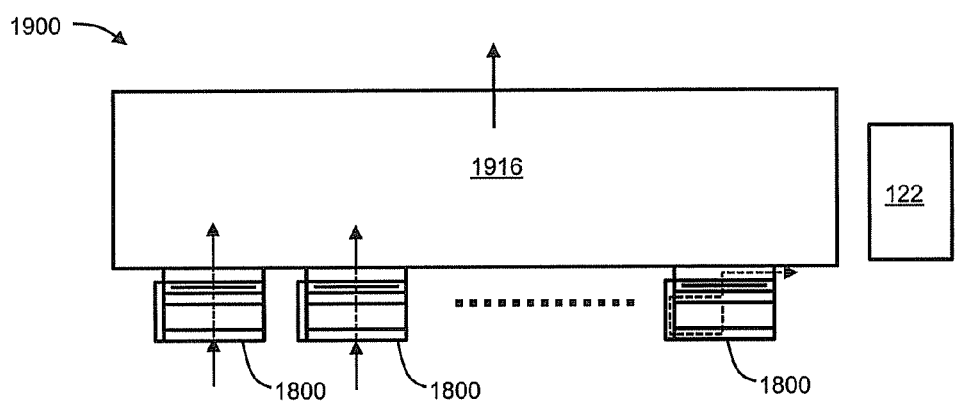
FIG. 19 illustrates one embodiment of a gas separation system having a plurality of micro-pump and separation bed assemblies.

FIG. 19 illustrates a system 1900 utilizing one or more of the exemplary systems 1800 of FIGS. 18A and 18B. System 1900, similar to systems shown in FIGS. 2A, 2B, and 13, further includes a product tank 1916 and control system 122. As illustrated, system 1900 can include one or more vacuum swing adsorption systems 1800 that are connected to or associated with product tank 1916. According to one control scheme, one or more systems 1800 can be in the fill cycle while one or more other systems 1800 can be in the purge cycle to thereby provide a continuous flow of product or oxygen gas into product tank 1916. Appropriate valving is provided (e.g., 1812) so that during the purge cycle, product tank 1916 is isolated from venting to atmosphere. In other embodiments, other valving and flow paths may be provided as necessary, including, for example, to provide bleed flow or pressure equalization.

In addition to the varying internal capabilities of micro-pump assemblies 800, by including more or less systems 1800 in system 1900, the volume and/or pressure of product or oxygen gas supplied to product tank 1916 can be varied and controlled. Additionally, by increasing or decreasing the frequency at which systems 1900 are operated, the volume and/or pressure of product or oxygen gas supplied to product tank 1916 can be varied and controlled.

Figure 20A:
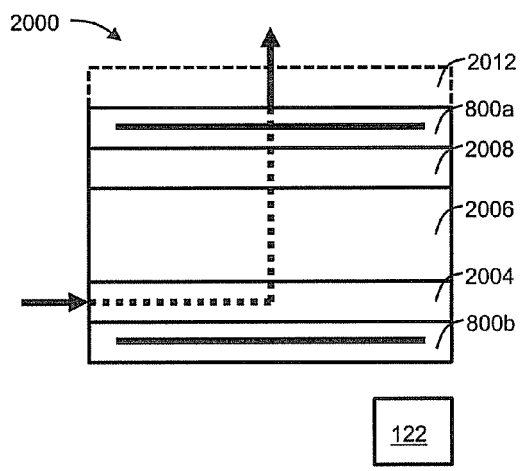
FIGS. 20A and 20B illustrate a second embodiment of vacuum sources or assemblies in connection with an associated separation bed.
Figure 20B:
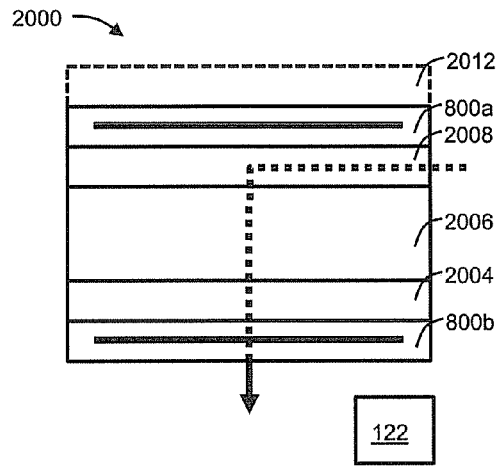

FIGS. 20A and 20B illustrate another embodiment of an exemplary gas concentrating system 2000. The system 2000 is similar to the separation system shown in FIG. 2C and includes a VSA system having two micro-pump assemblies 800a, 800b as vacuum sources and associated separation bed 2006. System 2000 also includes associated valves 2004, 2008, and optionally 2012. In one embodiment, one or more of the system 2000 components are integrated into a common housing or structure, which can be very compact and small due to micro-pump assemblies 800a, 800b being one or more micro-pumps (e.g., 802).

In operation, oxygen is produced during the fill cycle shown in FIG. 20A. During the fill cycle, vacuum source/micro-pump assembly 800a draws air into separation bed 2006 through valve 2004. In separation bed 2006, oxygen is allowed to pass while nitrogen is not. Oxygen is drawn out of separation bed 2006 and through valve 2008 and assembly 800a and out through valve 2012. When separation bed 2006 has reached its capacity, or nearly its capacity, the fill cycle ends as controlled by control system 122.

FIG. 20B illustrates the purge cycle for separation bed 2006. During the purge cycle, assembly 800b draws nitrogen out of the input side of separation bed 2006 through valve 2004. Valve 2008 can let room air into the output side of separation bed 2006. After purging, the separation bed 2006 is ready for another fill cycle, as controlled by control system 122.

Figure 21:
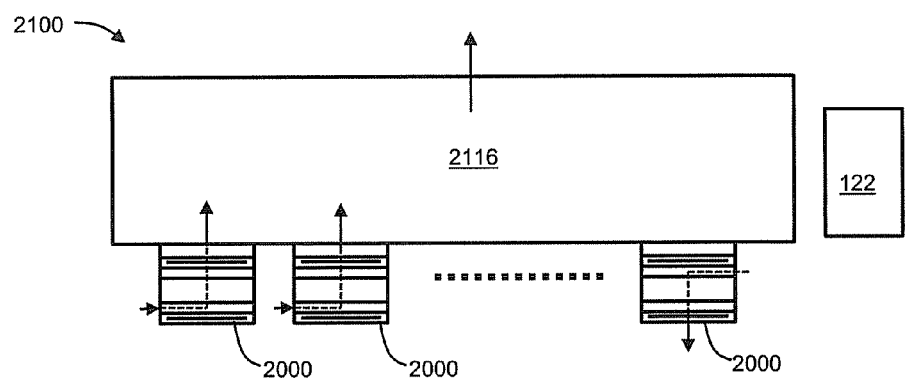
FIG. 21 illustrates another embodiment of a gas separation system having a plurality of micro-pump and separation bed assemblies.

FIG. 21 illustrates a system 2100 utilizing one or more of the systems 2000 of FIGS. 20A and 20B. System 2100 operates in a similar manner to the system of FIG. 2C and reference is made to that discussion, which is incorporated herein by reference.

As can be appreciated, any of the above systems 1200, 1300, 1400, 1500, 1600, 1700 may be integrated into an assembly similar to systems 1800, 2000 with associated pressure and vacuum sources (e.g., using micro-pump assemblies 800), valves, flow paths, etc.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, sensing including pressure, flow and concentration (oxygen and/or nitrogen) can be employed to control the fill and purge cycle times. Furthermore, by using a elements such as, for example, micro-pumps, the entire gas concentrating system can be made smaller, quieter, more compact, less vibration and more efficient in terms of energy usage. The system can be powered by one or more batteries or other sources of mobile power. Furthermore, by integrating one or more of the components, modular assemblies can be made assisting in assembly, disassembly and repair of systems. Therefore, the invention, in its broader aspects, is not limited to the specific details, the representative apparatus, and illustrative examples shown and described. Accordingly, departures can be made from such details without departing from the spirit or scope of the applicants' general inventive concept.

The following is claimed:

1. A gas separation assembly for separating product gas in a gas concentration system, comprising:
   at least one micro-pump assembly, each micro-pump assembly comprising at least one micro-pump, wherein each micro-pump comprises:
      an inlet for allowing gas flow into the micro-pump;
      an outlet for allowing gas flow out of the micro-pump;
      an actuating element responsive to a voltage applied directly across the actuating element to draw gas into a chamber from the pump inlet and expel gas from the chamber to the pump outlet, wherein the applied voltage causes the actuating element to deflect at a high frequency; and
      pump valving to prevent gas from flowing through the pump outlet while the micro-pump is drawing gas into the gas chamber from the pump inlet and to prevent gas from flowing through the pump inlet while the micro-pump is expelling gas from the gas chamber to the pump outlet;
   a separation bed to separate product gas from a source gas, comprising:

separation media to selectively adsorb at least one gas from the source gas to produce the product gas;
a separated gas port; and
a non-separated gas port;
wherein the separation bed is scaled according to the size of the micro-pump assembly;
a compact housing comprising the at least one micro-pump assembly and the separation bed; and
separation assembly valving to direct source gas to the non-separated gas port of the separation bed and to direct product gas from the separated gas port of the separation bed during a fill cycle;
wherein gas flows through the at least one micro-pump assembly and the separation bed during the fill cycle.

2. The gas separation assembly of claim 1, further comprising:
an outside gas port for allowing gas flow with gas outside the separation assembly;
a product gas port for allowing product gas flow;
wherein the separation assembly valving comprises fill flow paths to connect the outside gas port to the non-separated gas port of the separation bed and to connect the separated gas port of the separation bed to the product gas port.

3. The gas separation assembly of claim 1, wherein the separation assembly valving further directs gas to the separated gas port of the separation bed and from the non-separated gas port of the separation bed during a purge cycle.

4. The gas separation assembly of claim 1, wherein the separation assembly valving comprises a purge flow path different than a fill flow path.

5. The gas separation assembly of claim 1, wherein gas flows through the at least one micro-pump assembly and the separation bed during a purge cycle.

6. The gas separation assembly of claim 1, wherein the separation assembly valving comprises:
a first valve to selectively direct source gas to the non-separated gas port of the separation bed during a fill cycle and to selectively direct gas from the non-separated gas port during a purge cycle; and
a second valve to selectively direct product gas from the separated gas port of the separation bed during the fill cycle and to selectively direct gas to the separated gas port of the separation bed during the purge cycle.

7. The gas separation assembly of claim 1, wherein the at least one micro-pump assembly comprises:
a first micro-pump assembly for producing a fill cycle gas flow, wherein gas flows through the first micro-pump assembly and the separation bed during the fill cycle; and
a second micro-pump assembly for producing a purge cycle gas flow, wherein gas flows through the second micro-pump assembly and the separation bed during the purge cycle.

8. The gas separation assembly of claim 1, wherein each of the at least one micro-pump assemblies comprise a plurality of micro-pumps.

9. The gas separation system of claim 1,
wherein the separation assembly valving routes gas to the pump inlet and from the pump outlet.

10. A system for producing a product gas, comprising:
at least one gas separation assembly according to claim 1 to separate adsorbable components from a gas source; and
a controller, comprising logic to:
control the separation assembly valving of each of the at least one gas separation assemblies to produce the product gas.

11. The system of claim 10, further comprising:
a product tank to receive the product gas produced by the at least one gas separation assembly; and
wherein the at least one gas separation assembly is connected to the product tank.

12. The system of claim 10, wherein the at least one gas separation assembly comprises a plurality of gas separation assemblies.

13. The system of claim 12, wherein a first subset of the plurality of gas separation assemblies is controlled to produce the product gas in accordance with a first flow rate required by a user and second subset of the plurality of gas separation assemblies is controlled to produce the product gas in accordance with a second flow rate required by the user.

14. The system of claim 10, wherein each of the at least one gas separation assemblies comprises a plurality of high frequency micro-pump assemblies.

15. The gas separation assembly of claim 1, wherein the actuating element is a diaphragm.

16. The gas separation assembly of claim 1, wherein the actuating element is actuated by a piezo element.

17. The gas separation assembly of claim 1, wherein the actuating element is actuated at a frequency up to about 1 kHz.

18. The gas separation assembly of claim 1, wherein the actuating element is actuated at a frequency from about 1 kHz to about 10 kHz.

19. The gas separation assembly of claim 1, wherein the actuating element is actuated at a frequency greater than about 10 kHz.

20. The gas separation assembly of claim 1, wherein a thickness of the separation bed is less than three times a thickness of the micro-pump assembly.

21. A gas separation assembly for separating product gas in a gas concentration system, comprising:
at least one means for pumping, comprising:
an actuating means responsive to a voltage applied directly across the actuating means to draw gas into a chamber and expel gas from the chamber, wherein the applied voltage causes the actuating means to deflect at a high frequency;
a means for separating product gas from a source gas, comprising:
media means to selectively adsorb at least one gas from the source gas to produce the product gas;
a first connection means; and
a second connection means;
wherein the means for separating product gas is scaled according to the size of the at least one means for pumping;
a housing means comprising the at least one means for pumping and the means for separating product gas; and
valving means to direct source gas to the second connection means of the means for separating product gas and to direct product gas from the first connection means of the means for separating product gas during a fill cycle;
wherein gas flows through the at least one means for pumping and the means for separating product gas during the fill cycle.

22. A system for producing a product gas, comprising:
at least one gas separation assembly according to claim 19; and
a means for controlling, comprising logic to:
control the valving means of each of the at least one gas separation assemblies.

* * * * *